(12) United States Patent
Nair

(10) Patent No.: US 12,058,121 B2
(45) Date of Patent: Aug. 6, 2024

(54) SECURE SYSTEM AND METHOD FOR PREVENTING CROSS-SITE CREDENTIAL REUSE

(71) Applicant: Vivek Chinar Nair, San Jose, CA (US)

(72) Inventor: Vivek Chinar Nair, San Jose, CA (US)

(*) Notice: Subject to any disclaimer, the term of this patent is extended or adjusted under 35 U.S.C. 154(b) by 355 days.

(21) Appl. No.: 17/303,209

(22) Filed: May 24, 2021

(65) Prior Publication Data

US 2021/0367934 A1    Nov. 25, 2021

Related U.S. Application Data

(60) Provisional application No. 63/029,165, filed on May 22, 2020.

(51) Int. Cl.
*H04L 29/06* (2006.01)
*H04L 9/32* (2006.01)
*H04L 9/40* (2022.01)

(52) U.S. Cl.
CPC .......... *H04L 63/083* (2013.01); *H04L 9/3236* (2013.01)

(58) Field of Classification Search
CPC ... H04L 63/083; H04L 9/3236; H04L 9/0643; H04L 9/0894; H04L 63/10; H04L 63/20
USPC .............................................................. 726/6
See application file for complete search history.

(56) References Cited

U.S. PATENT DOCUMENTS

| | | | |
|---|---|---|---|
| 9,130,986 B2* | 9/2015 | Troyansky | G06F 21/6218 |
| 2020/0137109 A1* | 4/2020 | Endler | H04L 63/083 |
| 2020/0304544 A1* | 9/2020 | Vasanthapuram | G06F 16/953 |
| 2021/0117533 A1* | 4/2021 | Malka | H04L 9/008 |

* cited by examiner

*Primary Examiner* — Jeffrey C Pwu
*Assistant Examiner* — Nega Woldemariam
(74) *Attorney, Agent, or Firm* — Robinson IP Law, PLLC

(57) ABSTRACT

A system for preventing cross-site credential reuse includes: a plurality of secure services hosted on at least one server, each of the plurality of secure services having its own set of credentials; a central database for storing data relating to credentials associated with the plurality of secure services; whereby at least one of the plurality of secure services communicates with the central database to determine whether a credential is used across more than one of the plurality of secure services.

17 Claims, 31 Drawing Sheets

SECURE SYSTEM AND METHOD FOR PREVENTING CROSS-SITE CREDENTIAL REUSE

CROSS-REFERENCE TO RELATED APPLICATION

This application claims priority to U.S. Provisional Patent Application Ser. No. 63/029,165 for a "System and Method for Preventing Cross-site Credential Reuse" filed on May 22, 2020, the contents of which are incorporated by reference herein by its entirety.

FIELD

This disclosure relates to the field of user authentication. More particularly, this disclosure relates to systems and methods for preventing cross-site credential reuse.

BACKGROUND

Secret credentials such as passwords and private keys are used in many user authentication schemes to authenticate users attempting to access secure systems. FIG. 1 illustrates an exemplary user login process. An end user 131 submits user credentials 145, for example, a username and password, to a secure service 120 for authentication by transmitting a user login request 401. Users are generally allowed to choose their own password when creating a new account with a service. Many users reuse the same credential across multiple independent services in what is known as "cross-site credential reuse." FIG. 2 illustrates cross-site credential reuse by the end user 131. Cross-site credential reuse has the effect of allowing access to a user's various accounts across multiple secure services using the same set of credentials. It is estimated that approximately 81% of internet users have demonstrated cross-site credential reuse by using the same password across two or more sites and that 25% of users reuse a single password across the majority of their accounts. Users who select a distinct password or key for each service on which they hold an account are practicing "cross-site credential differentiation." FIG. 3 illustrates cross-site credential differentiation by the end user 131. Cross-site credential differentiation has the effect of allowing at most one user account across all services to be accessed using a given credential. It is estimated that less than 20% of internet users practice perfect cross-site credential differentiation.

The widespread occurrence of cross-site credential reuse enables attackers who obtain user credentials 145 from one service to use the same credentials to access accounts on other services where the credentials were reused. Referring to FIG. 4, an attacker 139 utilizes bots 159 to automate the process of attempting to use stolen credentials 149 to access user accounts on a victim service 129. This type of attack, where stolen account credentials from one service are used to compromise accounts on a separate service, is known as "credential stuffing."

Steps 301-303 of FIG. 5 illustrate an example of a credential stuffing attack. In step 301, the end user 131 demonstrates cross-site credential reuse by using the same username and password on two separate services, "Service A" 121 and "Service B" 122. In step 302, Service A 121 experiences a data breach event whereby stolen credentials 149 are obtained by an attacker 139. Because the end user 131 used the same credentials on both services, the stolen credentials 149 from Service A 121 can then be used by the attacker 139 to access the user's account on Service B 122, even though Service B 122 has not itself experienced a data breach (step 303). It is estimated that credential stuffing attacks account for over 30 billion malicious login attempts per year.

Various approaches for the prevention of credential stuffing attacks are presently in use. One approach to preventing credential stuffing attacks presently in use is rate limiting. Because credential stuffing attacks often involve millions of malicious login attempts, services can attempt to detect an unusually high volume of login traffic as an indication that a credential stuffing attack is occurring. By restricting login attempts per IP address, attackers may be throttled while leaving normal users largely unaffected. In practice, the use of botnets, proxies, and VPN servers allow IP-based rate limiting to be circumvented. The use of CAPTCHAs and proof-of-work algorithms to limit high-volume credential stuffing attacks without significantly impacting normal users has also been proposed. However, these strategies promise to at best throttle the rate of credential stuffing attacks rather than preventing them entirely. An additional approach presently in use is the implementation of password strength requirements to increase the difficulty of credential stuffing attacks. While password strength restrictions can prevent cross-site credential reuse in the event of conflicting requirements, they often lead users to use a single complex password across all of their accounts instead of practicing cross-site credential differentiation. Another credential stuffing prevention approach currently in use involves collecting extensive blacklists of credentials that are known to have been compromised in previous data breaches. However, credentials will not appear on these blacklists until after the data breach leaking those credentials is identified and contained, which may not occur until well after a data breach has occurred. During the period between a data breach taking place and the breach being detected, attackers are free to conduct credential stuffing attacks without any risk of being thwarted by the inclusion of the leaked credentials on a credential blacklist. Therefore, all of these existing approaches fail to completely prevent credential stuffing attacks.

Credential stuffing attacks are not possible when users practice cross-site credential differentiation by using distinct credentials for every service on which they register an account. However, most users will not practice cross-site credential differentiation unless this constraint is enforced. What is needed, therefore, is a system and method for preventing cross-site credential reuse.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a system and method for preventing cross-site credential reuse described herein may be implemented using various components such as one or more computers, computer readable storage mediums, and computer networks for storing and transmitting data as described in greater detail below. The system and method for preventing cross-site credential reuse is operable across multiple components using network connectivity, servers, databases, and devices such as smartphones or personal computers to receive and transmit data between components.

Figure 6:
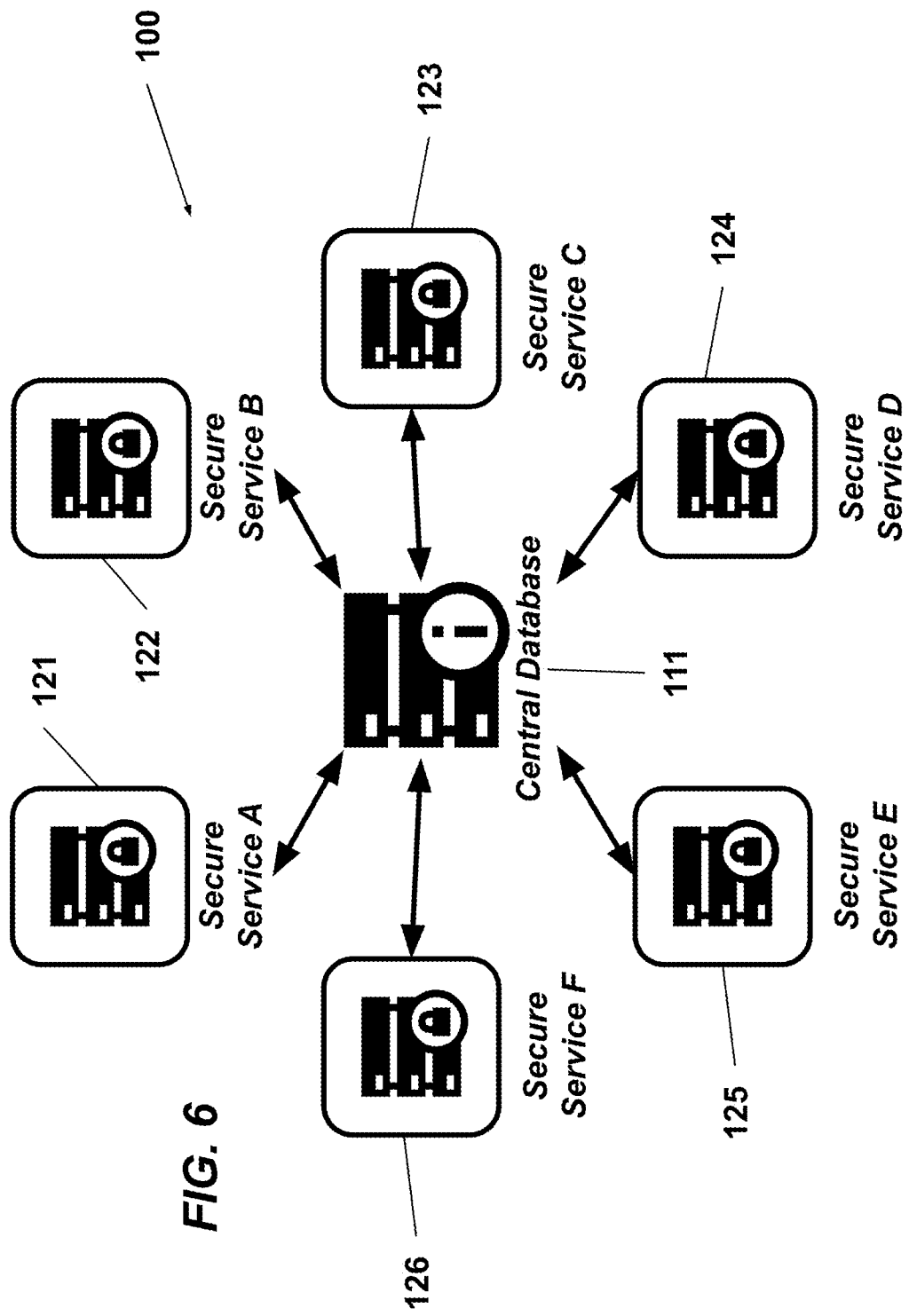
FIG. 6 shows a diagram of a centralized system and method for preventing cross-site credential reuse according to one embodiment of the present disclosure.

FIG. 6 shows a basic embodiment of a centralized system for preventing cross-site credential reuse 100 using two or more secure services 121-126 in communication with a central database 111. The term "database" here refers to an electronic store of information, whether via the use of a traditional relational or non-relational database management system or through a third-party online API service with its own underlying data storage mechanism. The two or more secure services 121-126 submit user credentials 145 to the central database 111. The term "secure service" as used herein may refer to a service where the use of credentials is required to access some or all functions of the service. The central database 111 maintains a record of user credentials 145 across all associated services. When an end user 131 wishes to create a new user account on one of the two or more secure services 121-126, the service queries the central database 111 to determine if the proposed credential for the new account matches an existing credential associated with the end user 131 on a separate service. If the service determines that the proposed credential matches a known credential in the central database 111, it may reject the proposed credential, thereby eliminating cross-site credential reuse. The same process may also occur when an existing end user 131 wishes to change or reset the credential on an existing account with one of the two or more secure services 121-126.

Figure 7:
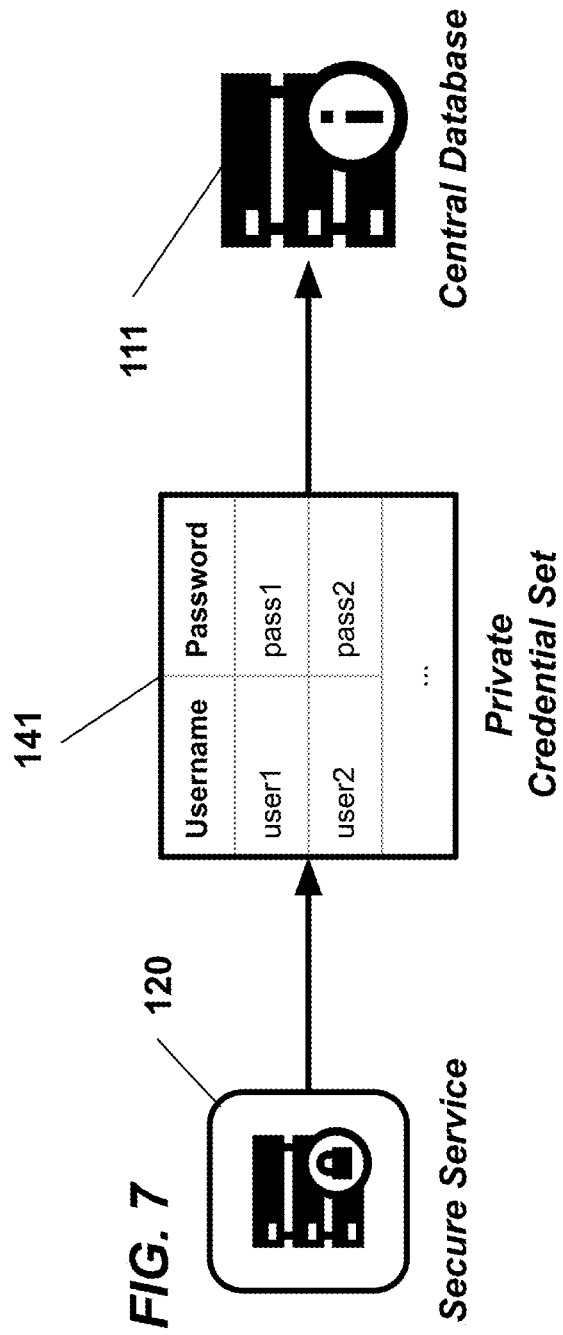
FIG. 7 shows a process of a secure service uploading a credential set to a central database according to one embodiment of the present disclosure.

Referring to FIG. 7, a secure service 120 uploads a private credential set 141 to a central database 111. During a set up process, the secure service 120 provides the credentials associated with all of its existing user accounts to a central database 111. The central database 111 stores these credentials to be later queried by other services looking to prevent their credentials from being reused by the secure service 120. The secure service 120 providing the private credential set 141 to the central database 111 benefits from doing so by preventing credentials from user accounts on the service from being reused by user accounts on a separate service. In the event of a data breach of the credentials of the separate service, the lack of credential reuse mitigates the possibility of a credential stuffing attack affecting the secure service 120.

Figure 1:
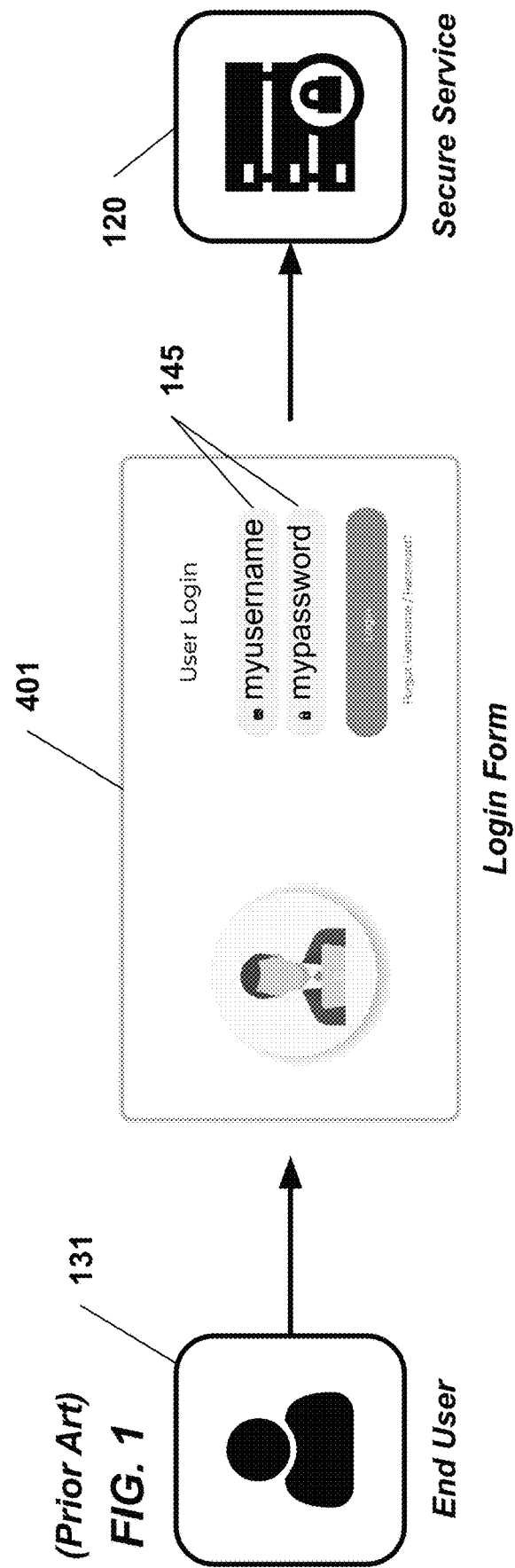
FIG. 1 shows a process of an end user accessing a secure service using a private credential.
Figure 2:
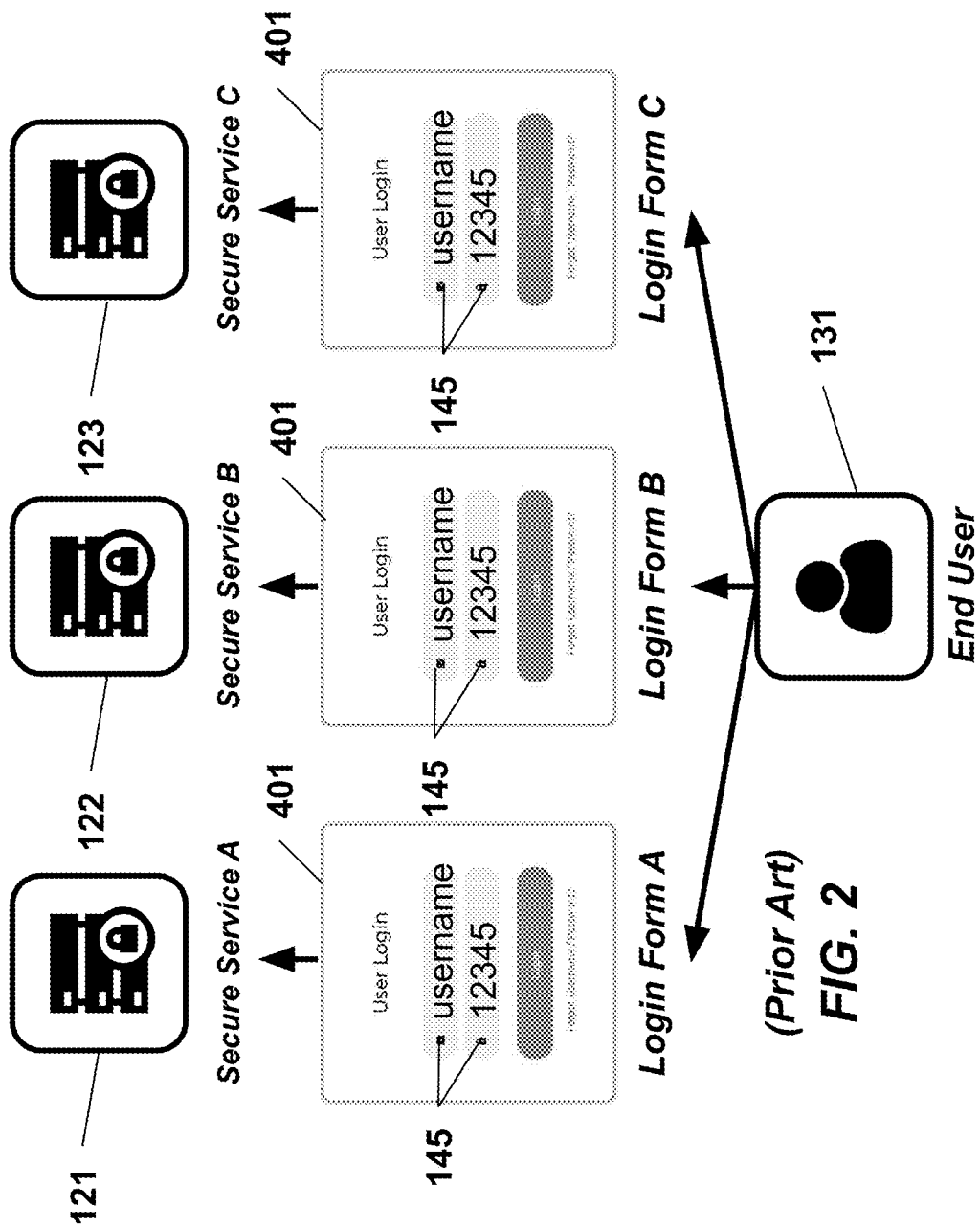
FIG. 2 shows cross-site credential reuse by an end user.
Figure 3:
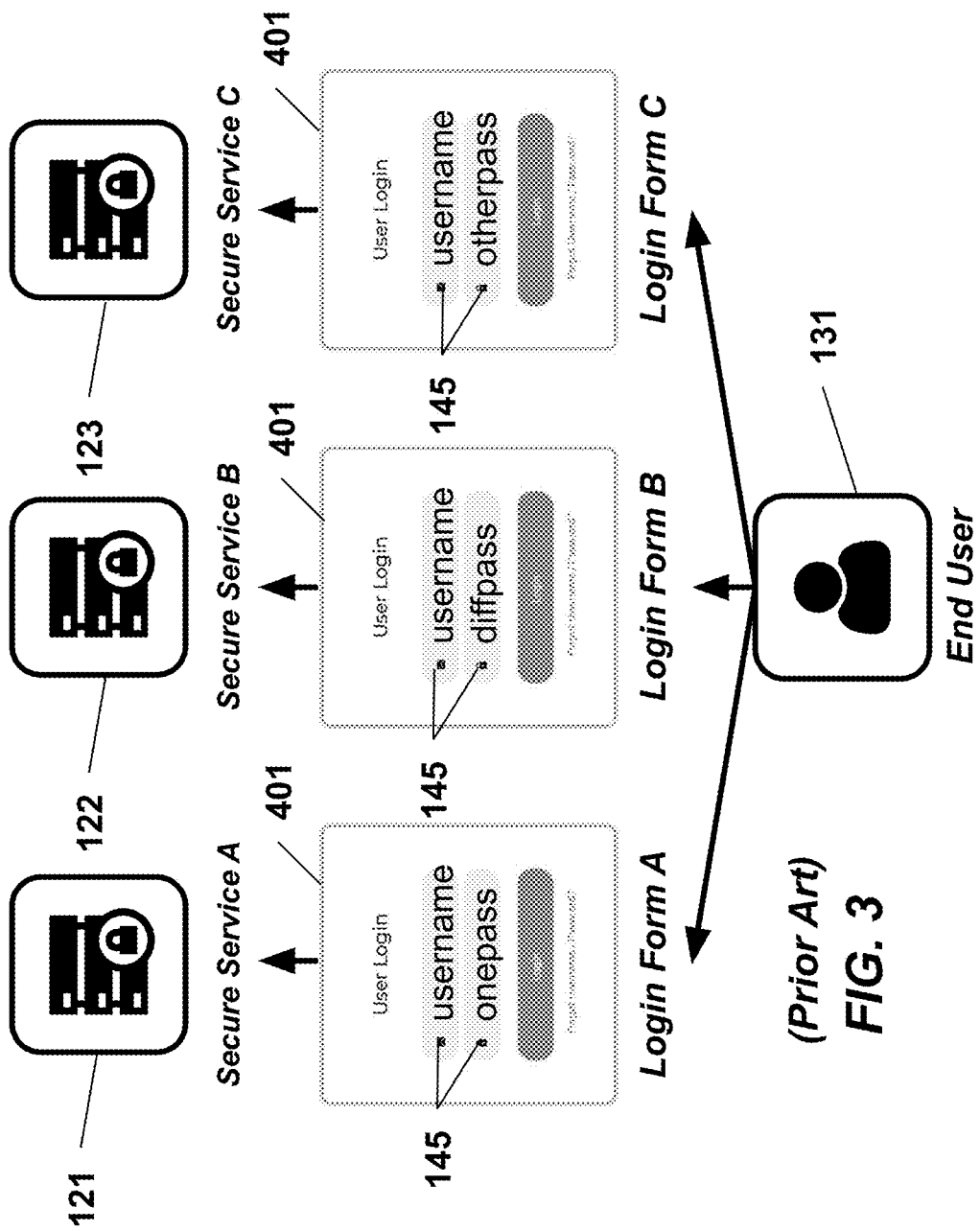
FIG. 3 shows cross-site credential differentiation by an end user.
Figure 4:
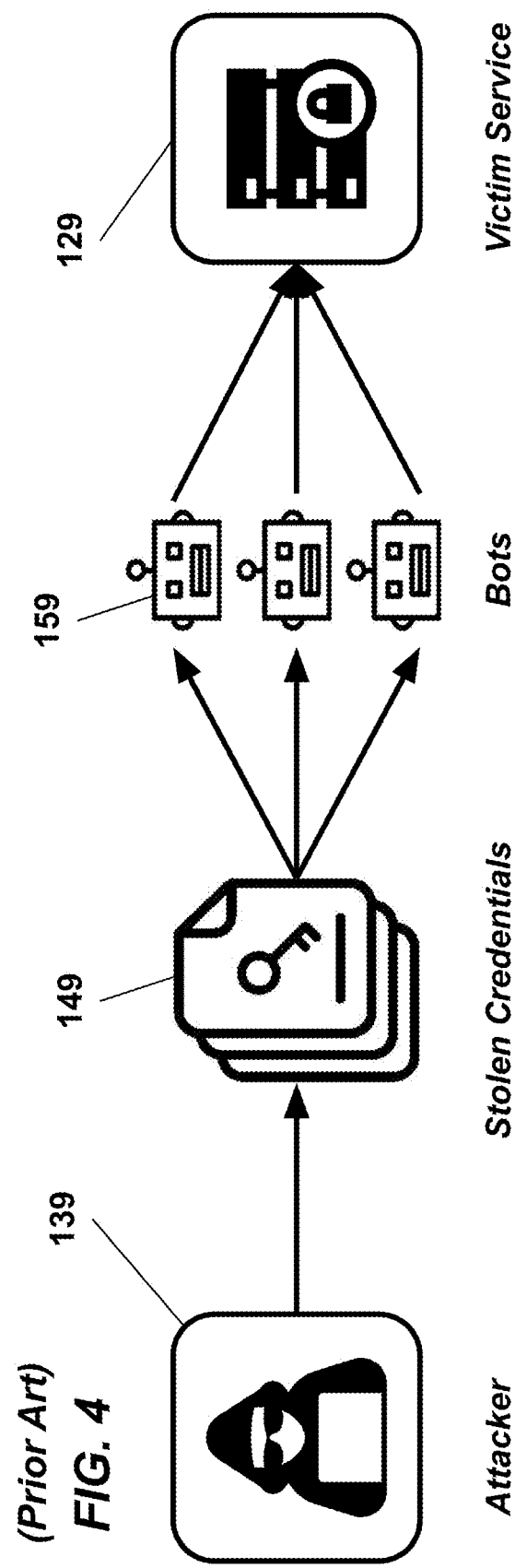
FIG. 4 shows a credential stuffing attack.
Figure 5:
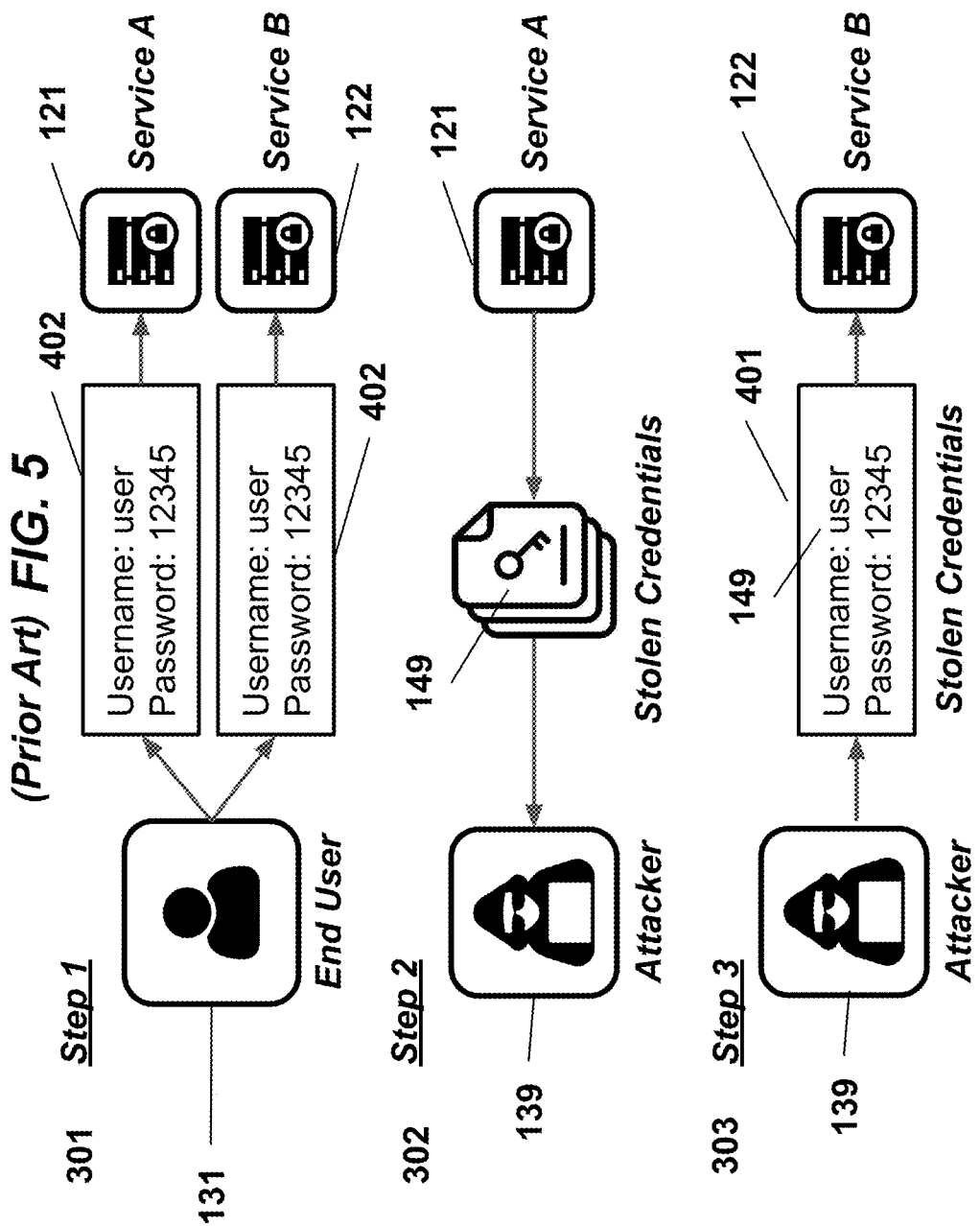
FIG. 5 shows a process of stolen credentials from one service being used to compromise accounts on a separate service.
Figure 8:
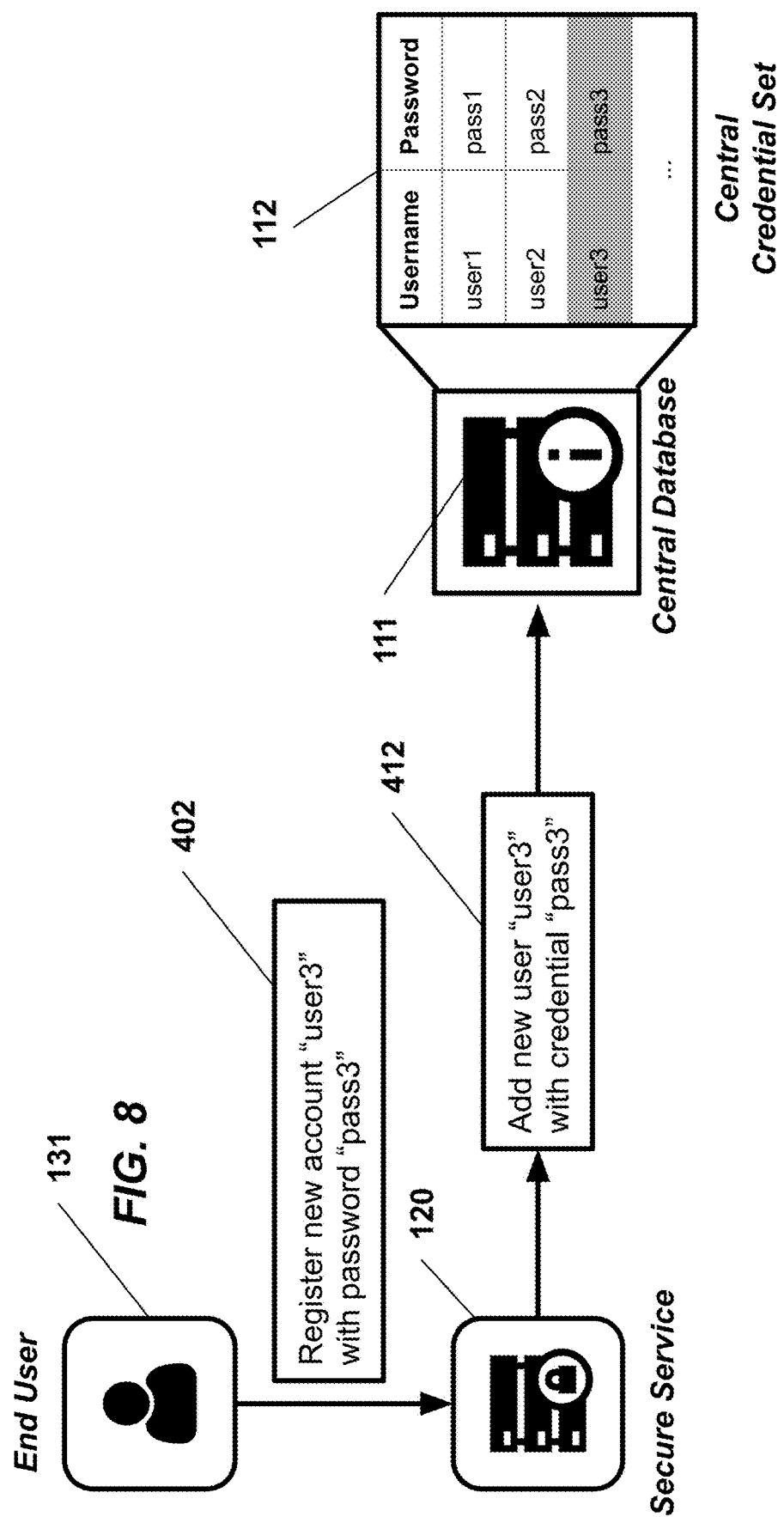
FIG. 8 shows a process of a secure service submitting a registration request to a central database after receiving a user registration request according to one embodiment of the present disclosure.

Referring now to FIG. 8, a registration request 412 is transmitted from the secure service to add a new credential to the central database 111 in response to a new user registration request 402. The central database 111 adds the provided credential to a central credential set 112 stored on the central database 111, and will be considered in any future queries to the central database 111. It is necessary for secure services to provide the central database 111 with new user credentials 145 (FIG. 1) upon each new user registration request 402 to maintain currency of the central database 111 and extend protections against credential reuse to users who registered with the secure service 120 after the initial set up process.

Figure 9:
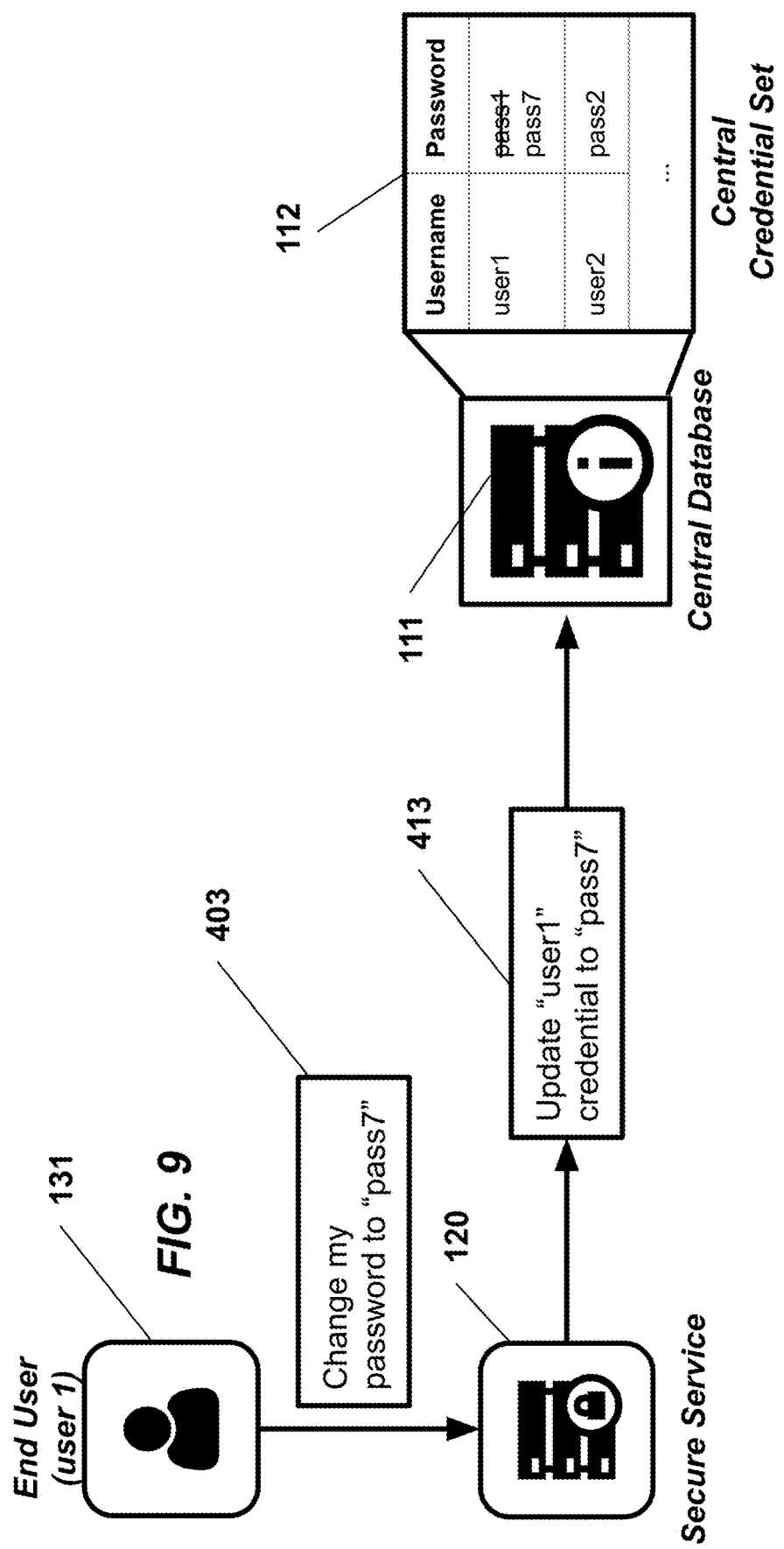
FIG. 9 shows a process of a secure service submitting a credential update request to a central database after receiving a user credential change or reset request and the central database subsequently overwriting the old credential according to one embodiment of the present disclosure.

Referring now to FIG. 9, a credential update request 413 is transmitted from the secure service 120 to update a credential stored on a central database 111 in response to a user credential change or reset request 403. The central database 111 updates the stored central credential set 112 by changing the credential associated with the specified end user 131 to the new credential provided by the secure service 120. It is necessary for secure services to provide the central database 111 with updated user credentials 145 (FIG. 1) upon each credential change event to maintain the currency of the central database 111 and extend protections against credential reuse to the new credentials of the end user 131.

Figure 10:
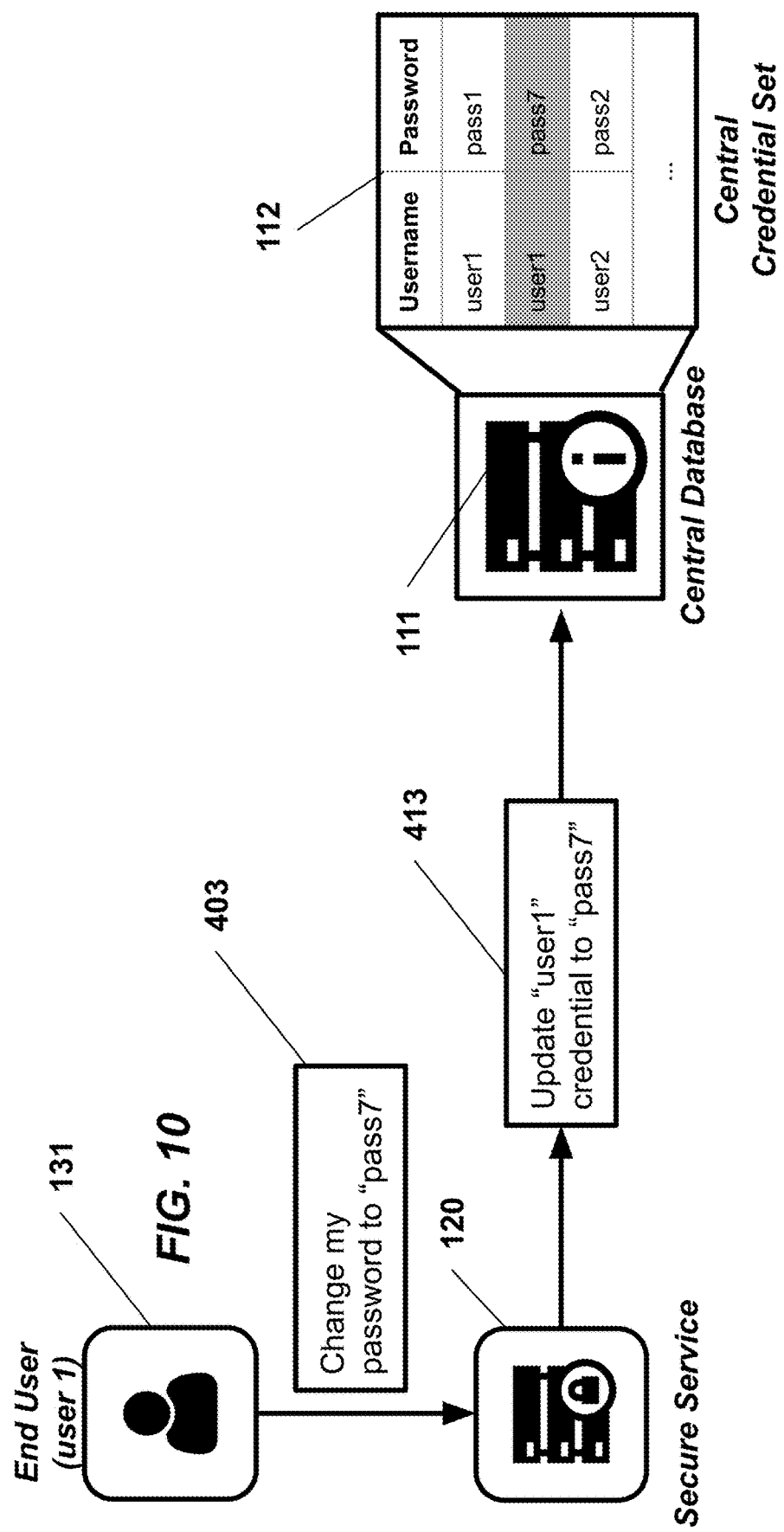
FIG. 10 shows a process of a secure service submitting a credential update request to a central database after receiving a user credential change or reset request and the central database subsequently recording both the old and new credentials according to one embodiment of the present disclosure.

Referring now to FIG. 10, in one embodiment, the central database 111 maintains a record of both the old and new credentials of the end user 131 in the event of a user credential change or reset request 403 and subsequent credential update request 413. The central database 111 therefore contains every previous credential of all users in addition to the current credentials of all users. This variant prevents attackers who obtain previous credentials of users via a data breach of an outdated credential set of a service from using the previous credentials in a credential stuffing attack against a separate service.

Figure 11:
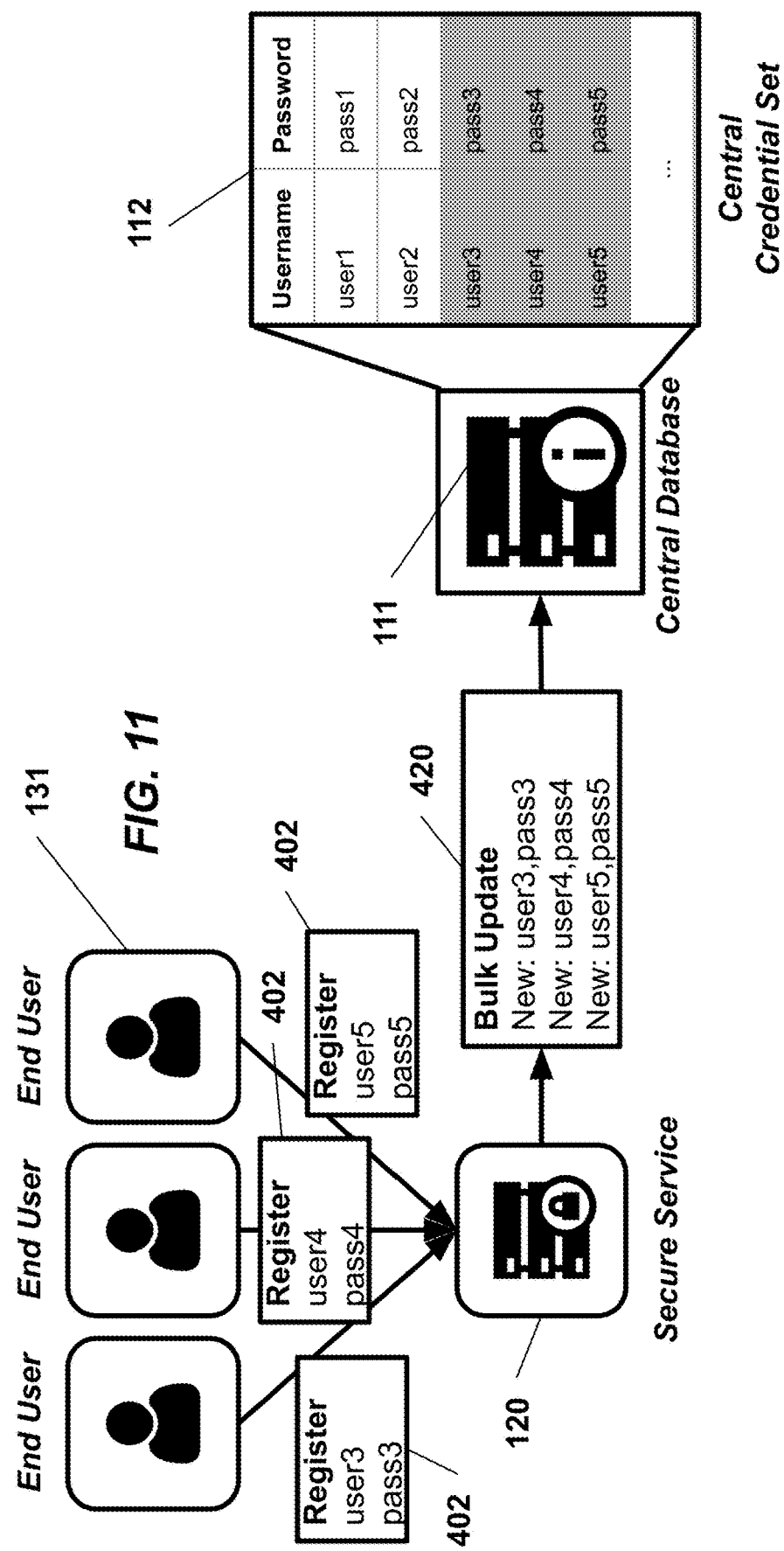
FIG. 11 shows a process of a secure service submitting a bulk request to a central database after receiving multiple new user registration requests according to one embodiment of the present disclosure.

Referring now to FIG. 11, in one embodiment, multiple user credential change or new user registration requests 402 are processed within a single bulk request 420. This prevents the central database 111 from being overwhelmed with a large number of individual requests when one or more of the associated services has a high volume of new user registrations 402 or credential changes.

Figure 12:
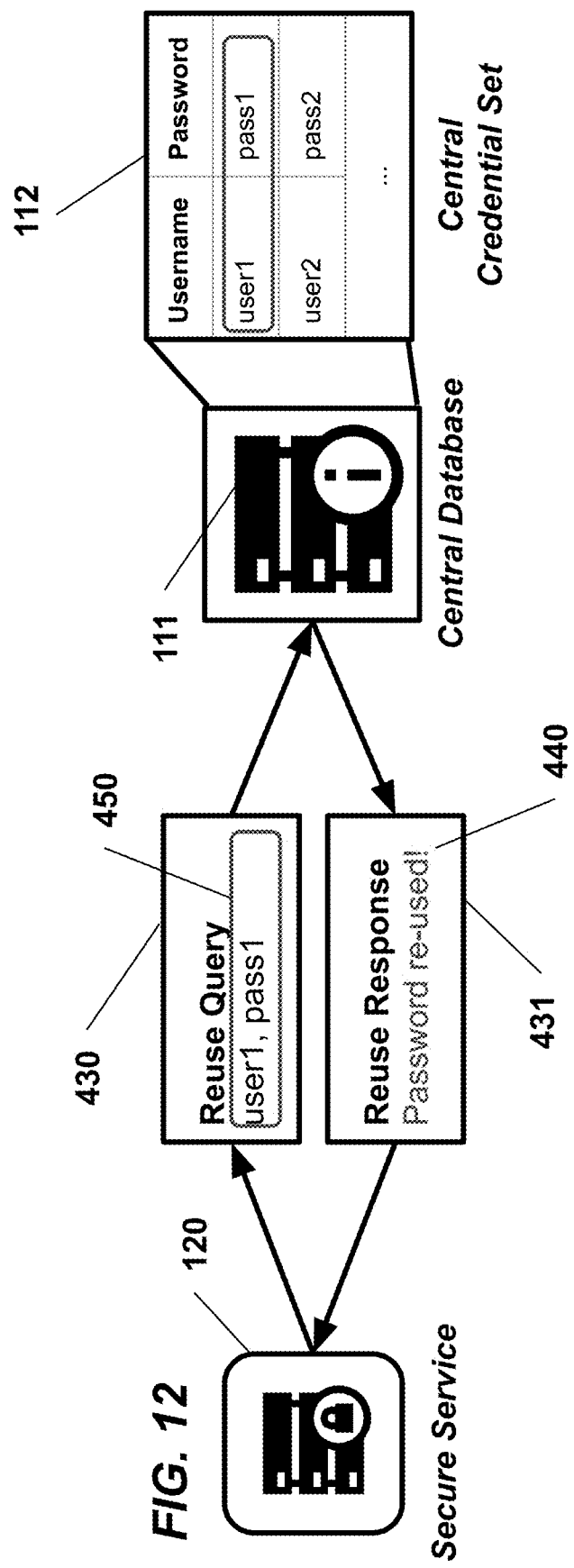
FIG. 12 shows a process of a secure service querying a central database with a credential reused by the same end user according to one embodiment of the present disclosure.
Figure 13:
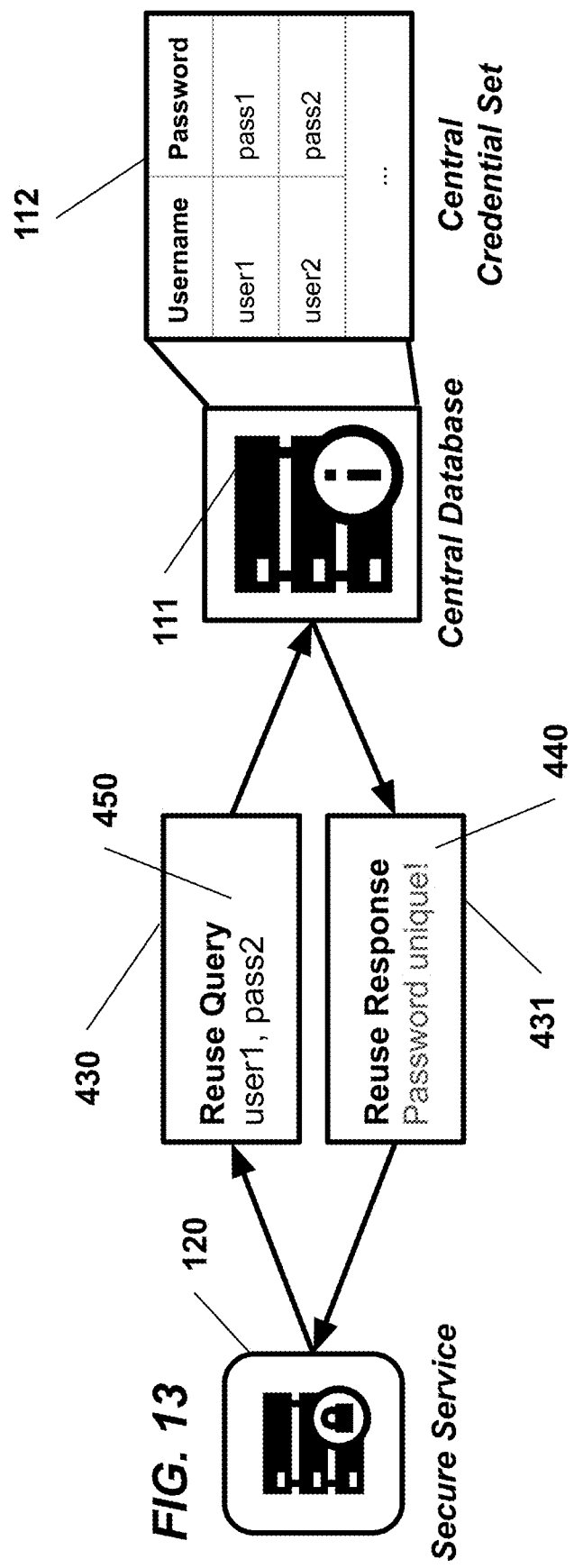
FIG. 13 shows a process of a secure service querying a central database with a credential not reused by the same end user according to one embodiment of the present disclosure.

Referring now to FIG. 12, a secure service 120 queries a central database 111 with a credential reuse query 430 containing a proposed user credential 450, and the central database 111 responds with a credential reuse response 431 containing a status code and/or status message 440 indicating whether the same credential was used by the end user 131 on a separate service known to the central database 111. Per the example of FIG. 12, the queried username and password combination is already known to the central database 111, causing the central database 111 to respond with a status code and/or status message 440 indicating that the credential was reused. The secure service 120 can then reject the proposed credential. Cross-site credential reuse is thereby prevented. In the case that a queried username and password combination is not already known to the central database 111, a response with a status code and/or status message 440 is transmitted from the central database 111 indicating that the credential is unique, as shown in FIG. 13.

Figure 14:
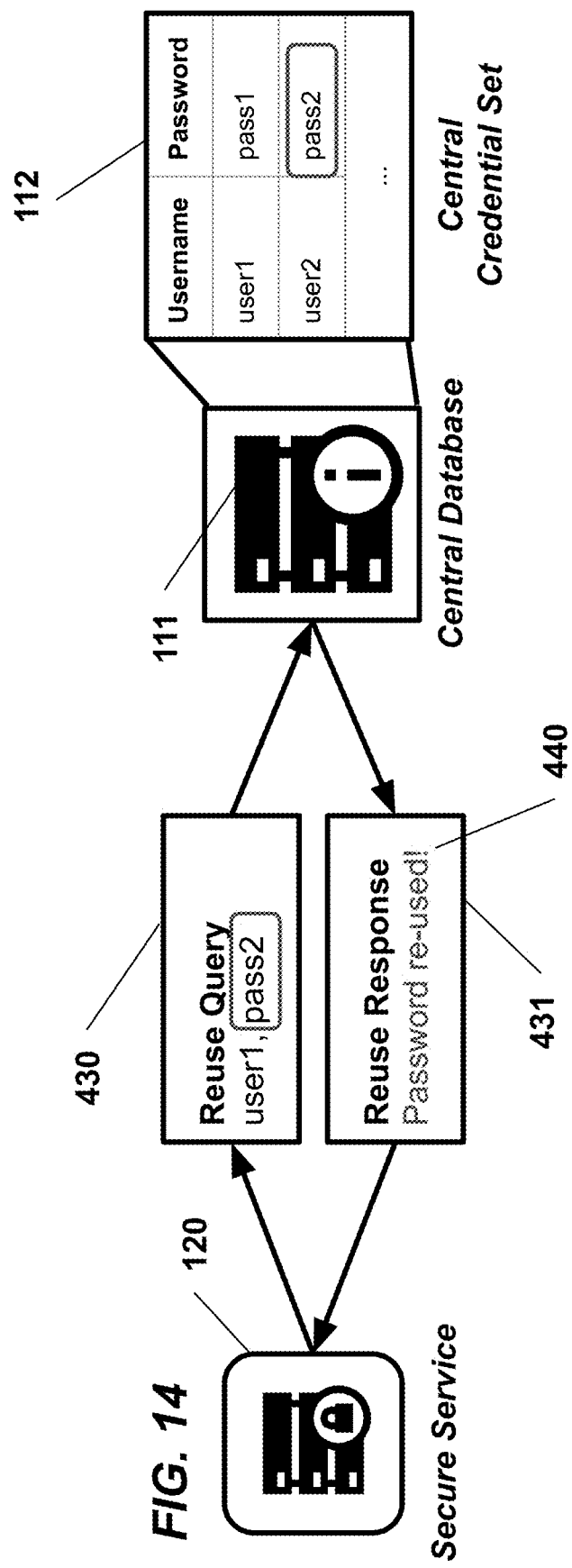
FIG. 14 shows a process of a secure service querying a central database with a credential reused by a different end user according to one embodiment of the present disclosure.

Referring to FIG. 14, in one embodiment, queried credentials are checked against the set of credentials associated with all users rather than just the credentials associated with the end user 131 for which they were queried. As a result, the central database 111 responds with a status code and/or status message 440 indicating whether the same credential was used by any user on a service known to the central database 111. This method has the additional benefit of mitigating brute-force attacks where an entire credential set consisting of credentials from numerous users are used in an attempt to access the account of a single target user. As shown in FIG. 14, the queried credential is already known to the central database 111, causing the central database 111 to respond with a status code and/or status message 440 indicating that the credential was reused. The secure service 120 can then reject the proposed credential. Cross-site and cross-user credential reuse is thereby prevented. It is further recommended that any users matching the queried credential be notified, or their credentials automatically reset. When credentials are checked against the set of credentials associated with all users, it is not necessary for the central database to store user identifiers in combination with each credential. However, doing so is required in order to notify users or automatically reset their credentials when their credential matches a query.

Figure 15:
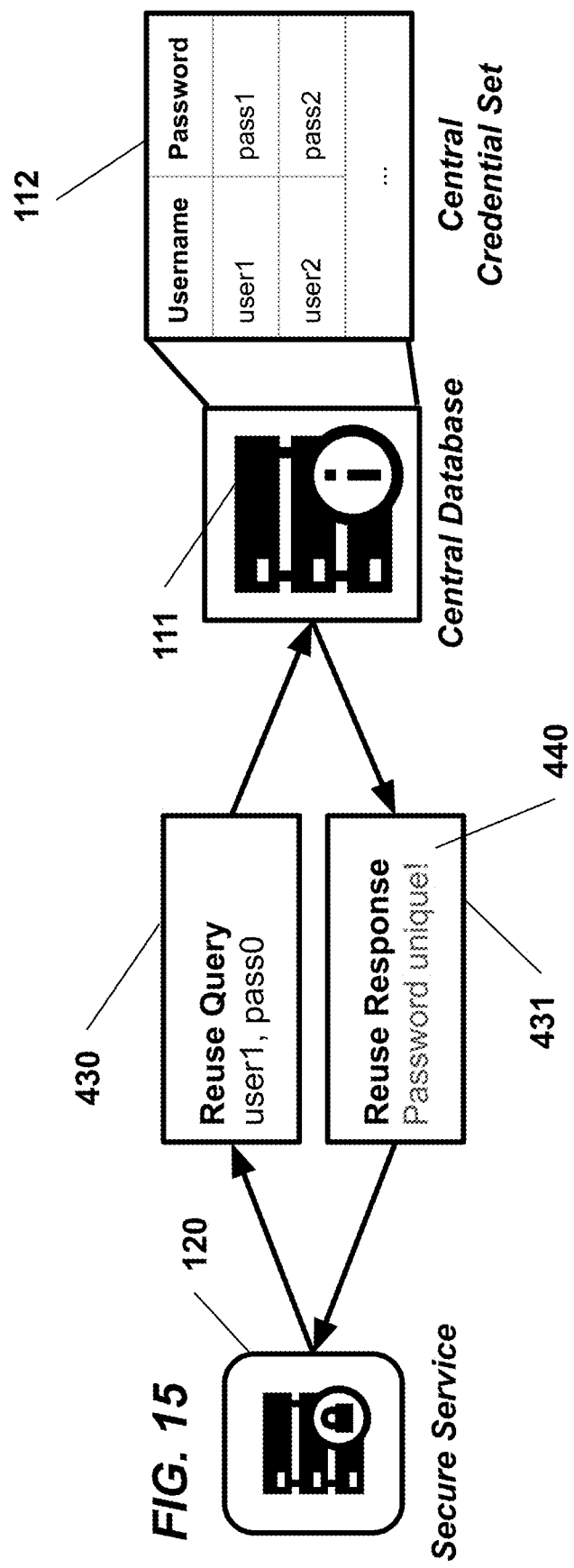
FIG. 15 shows a process of a secure service querying a central database with a unique credential according to one embodiment of the present disclosure.

Referring now to FIG. 15, in the case that a queried credential is not already known to the central database 111, credential reuse response 431 is transmitted containing a status code and/or status message 440 indicating that the credential is unique. In one embodiment, queried credentials are automatically stored by the central database 111 and referenced in future queries.

Figure 16:
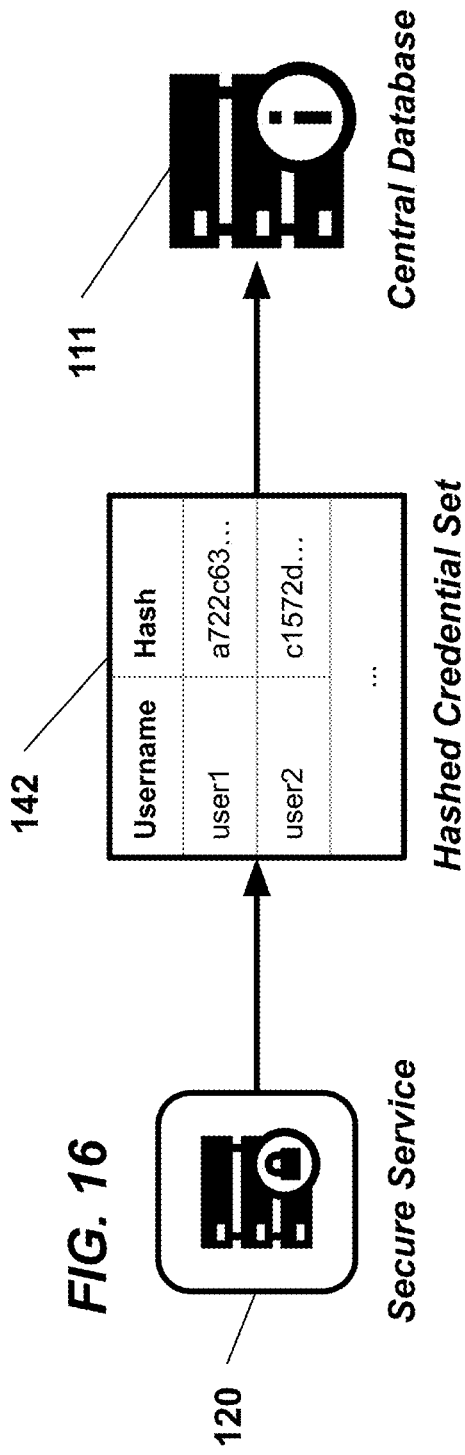
FIG. 16 shows a process of a secure service uploading a hashed credential set to a central database according to one embodiment of the present disclosure.

Referring to FIG. 16, in one embodiment, cryptographic hashes of user credentials 145 are stored on the central database 111 instead of storing credentials in plaintext. The secure service 120 uploads a hashed credential set 142 to the central database 111 during an initial set up process, the hashed credential set 142 containing a cryptographic hash of each credential instead of containing credentials in plaintext format. Alternatively, the credentials may still be transmitted directly by the secure service 120 and transformed into cryptographic hashes by the central database 111 prior to storage.

Figure 17:
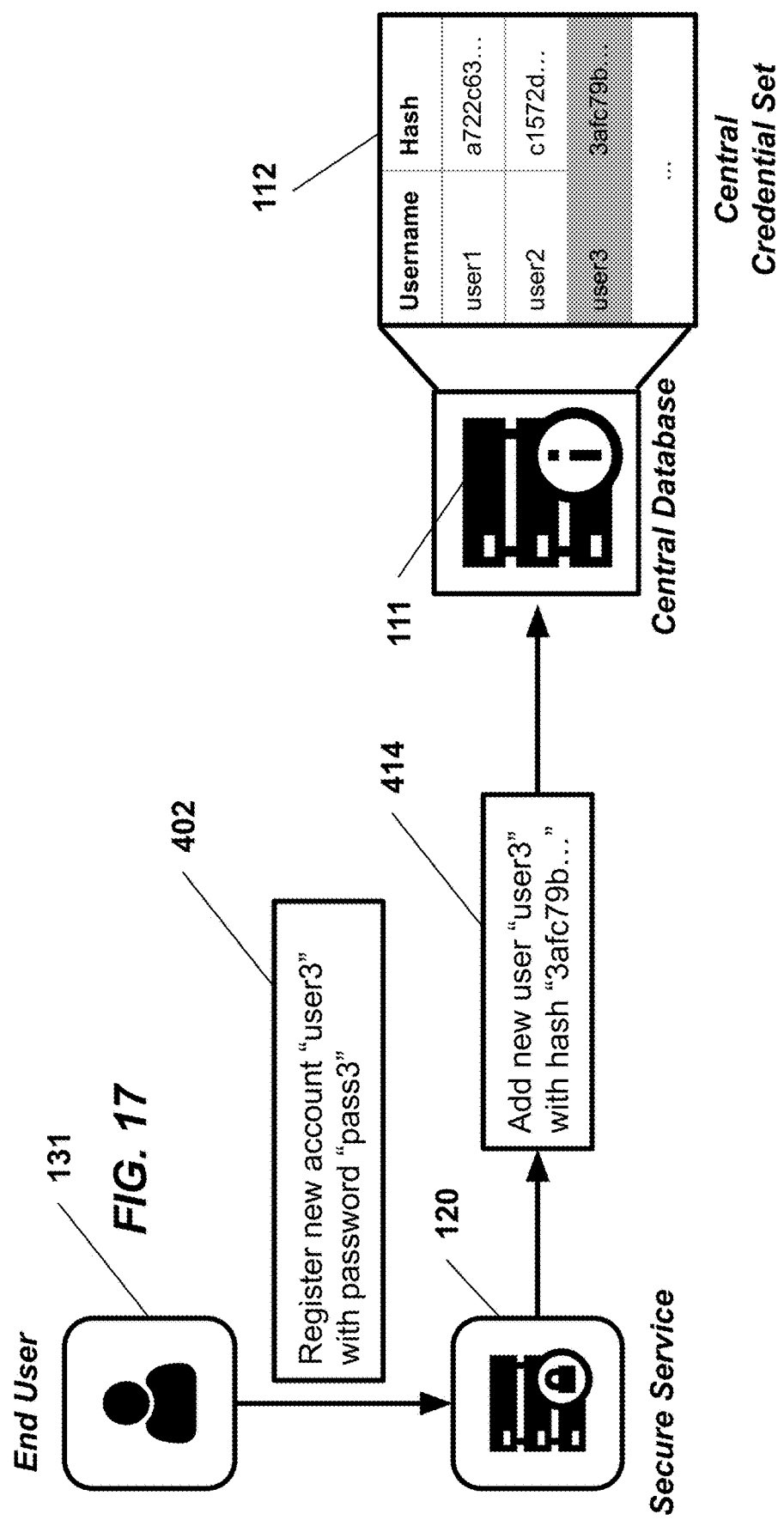
FIG. 17 shows a process of a secure service submitting a hashed registration request to a central database after receiving a user registration request according to one embodiment of the present disclosure.

Referring now to FIG. 17, when the secure service 120 adds a new credential to the central database 111 in response to the new user registration request 402, the central database 111 may provide a hashed registration request 414 containing a hash of the new credential, rather than providing the credential itself. Alternatively, the new credential may still be transmitted directly by the secure service 120 and transformed into a cryptographic hash by the central database 111 prior to storage.

Figure 18:
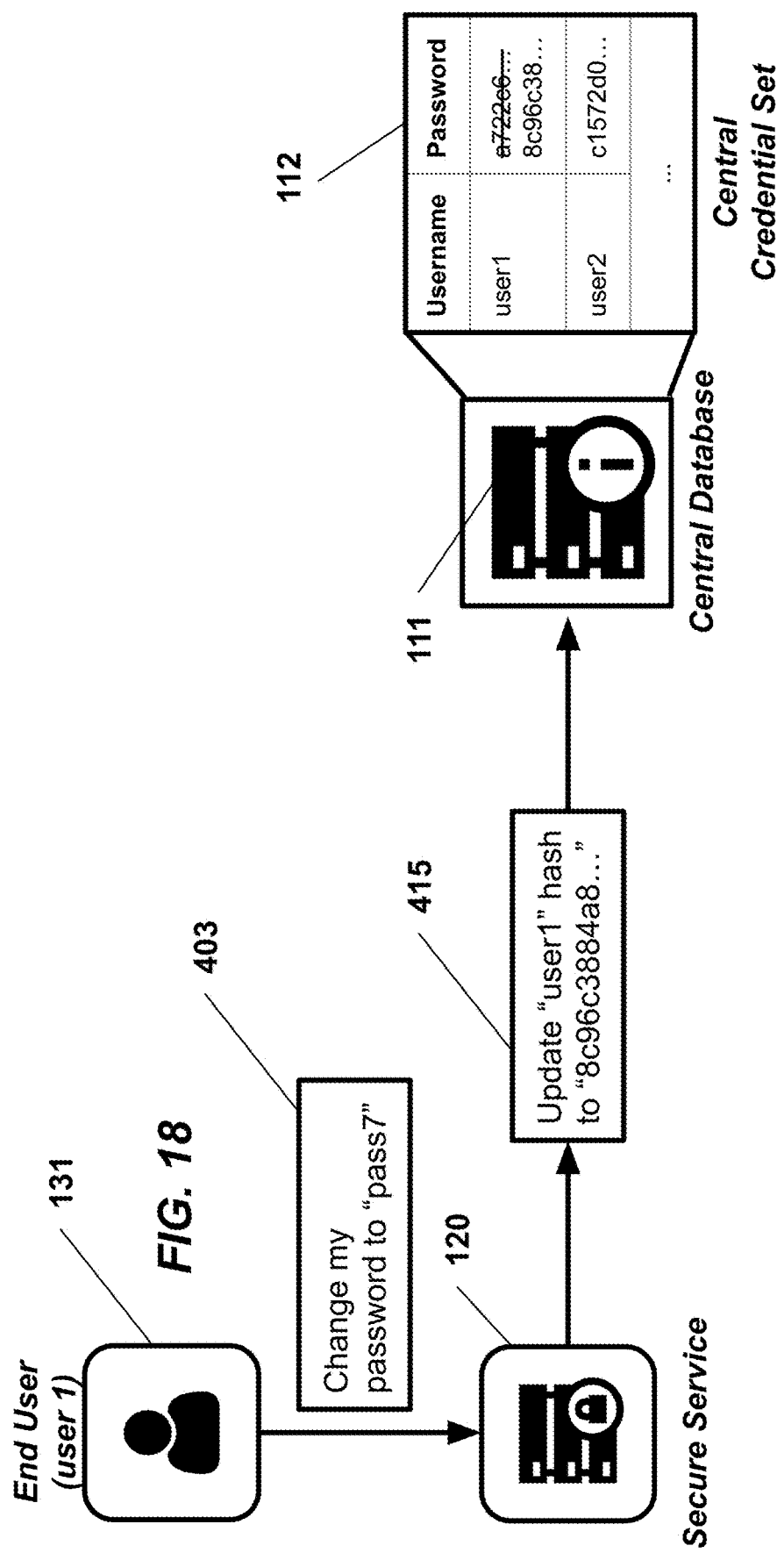
FIG. 18 shows a process of a secure service submitting a hashed credential change request to a central database after receiving a user credential change or reset request according to one embodiment of the present disclosure.

Referring now to FIG. 18, when a secure service 120 updates a credential stored on the central database 111 in response to the user credential change or reset request 403, a hashed credential change request 415 may be provided containing a hash of the updated credential, rather than providing the new credential itself. Alternatively, the updated credential may still be transmitted directly by the secure service 120 and transformed into a cryptographic hash by the central database 111 prior to storage.

Figure 19:
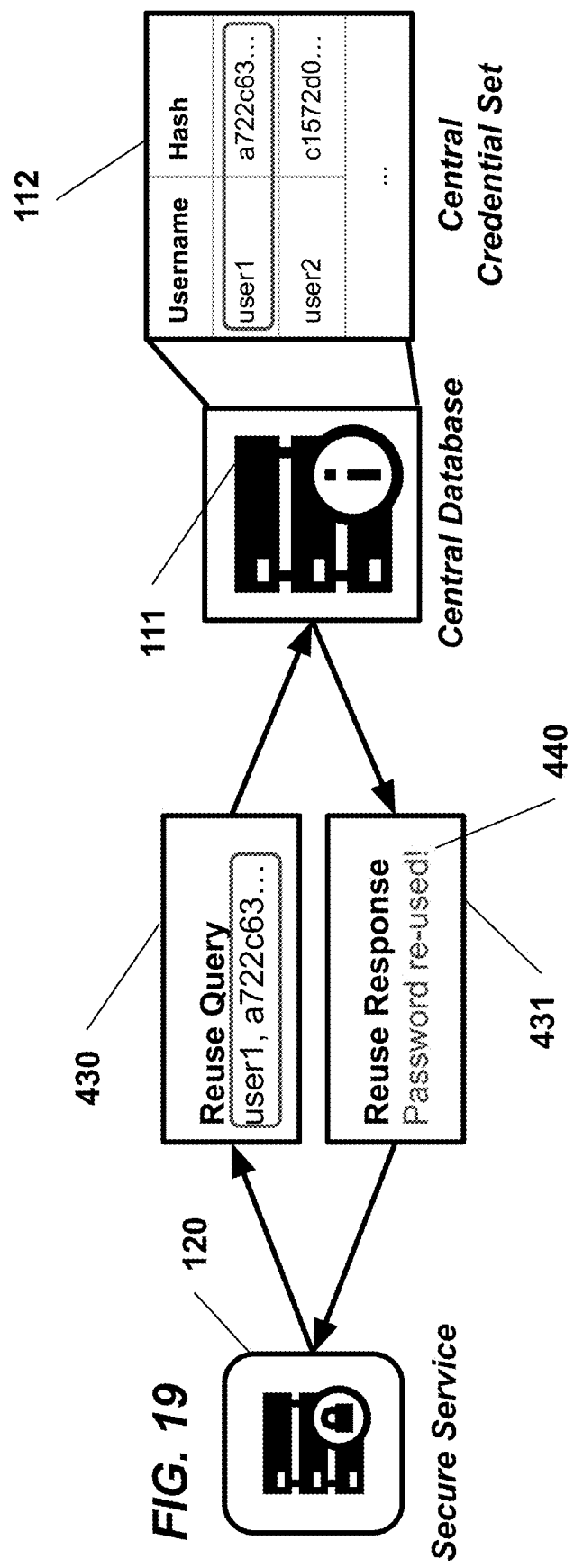
FIG. 19 shows a process of a secure service querying a central database with a reused credential by providing a hash of the proposed credential according to one embodiment of the present disclosure.

Referring now to FIG. 19, when the secure service 120 queries the central database 111 with the credential reuse query 430 containing the proposed user credential 450, a hash of the proposed credential, as shown in FIG. 19 may be provided, rather than the credential itself. Alternatively, the proposed credential may still be transmitted directly by the secure service 120 and transformed into a cryptographic hash by the central database 111 prior to being referenced against the stored hashes. Storage of cryptographic hashes rather than plaintext credentials prevents a data breach of the central database 111 from exposing the user credentials 145 of all of the associated secure services. Transmission of credentials in their hashed form rather than plaintext prevents the interception of communications in transit from exposing user credentials 145. Alternatively, the central database can store a hash of both a user identifier and user credential, for example in the form SHA256(user||pass). Secure services would similarly query the central database by providing a hash of both the user identifier and proposed user credential.

Figure 20:
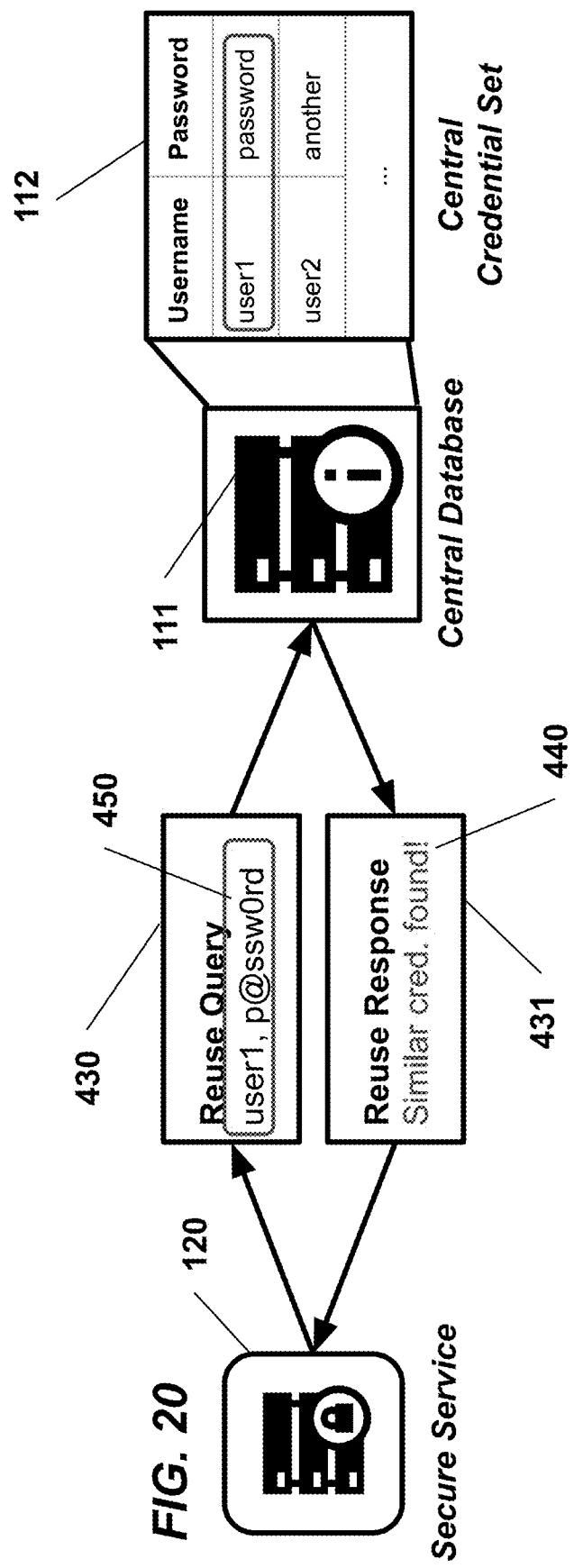
FIG. 20 shows a process of a secure service querying a central database with a credential where a similar credential is identified according to one embodiment of the present disclosure.

Referring now to FIG. 20, in one embodiment, credentials that are similar but not identical to credentials known to the central database 111 are additionally identified. The secure service 120 queries the central database 111 with the credential reuse query 430 containing the proposed user credential 450, and the central database 111 responds with the credential reuse response 431 containing status code and/or status message 440 indicating whether a similar credential was used by the end user 131 on a separate service known to the central database 111. The central database 111 checks the similarity of the queried credential to other known credentials using an edit distance algorithm, such as Levenshtein distance. Because attackers can use brute force tools to rapidly generate large numbers of variants of known credentials, checking credential similarity rather than only checking for identical credentials is useful for preventing advanced credential stuffing attacks.

Figure 21:
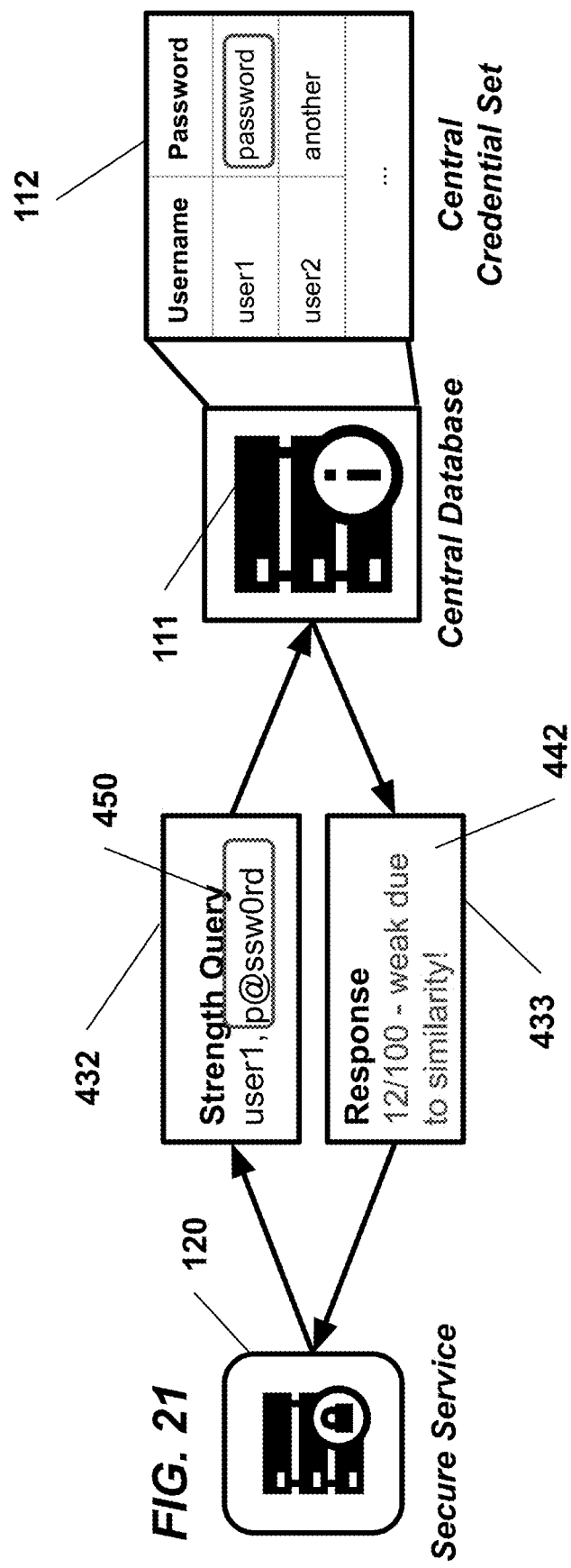
FIG. 21 shows a process of a secure service querying a central database with a credential to determine its strength according to one embodiment of the present disclosure.

Referring now to FIG. 21, in one embodiment, the central database 111 returns a credential strength response 433 containing a measure of credential strength 442 in response to credential strength queries 432 containing proposed user credentials 450. Credential strength may be calculated as a metric of various factors including length and the inclusion of numerals and special characters. The similarity of the proposed credential to other credentials in the central database 111 is an additional factor in calculating credential strength, where credentials that are similar to other credentials in the central database 111 are considered weaker. Providing a metric of credential strength in response to queried credentials allows each secure service 120 to set its own threshold for minimal credential strength based on the perceived sensitivity of that particular service.

Figure 22:
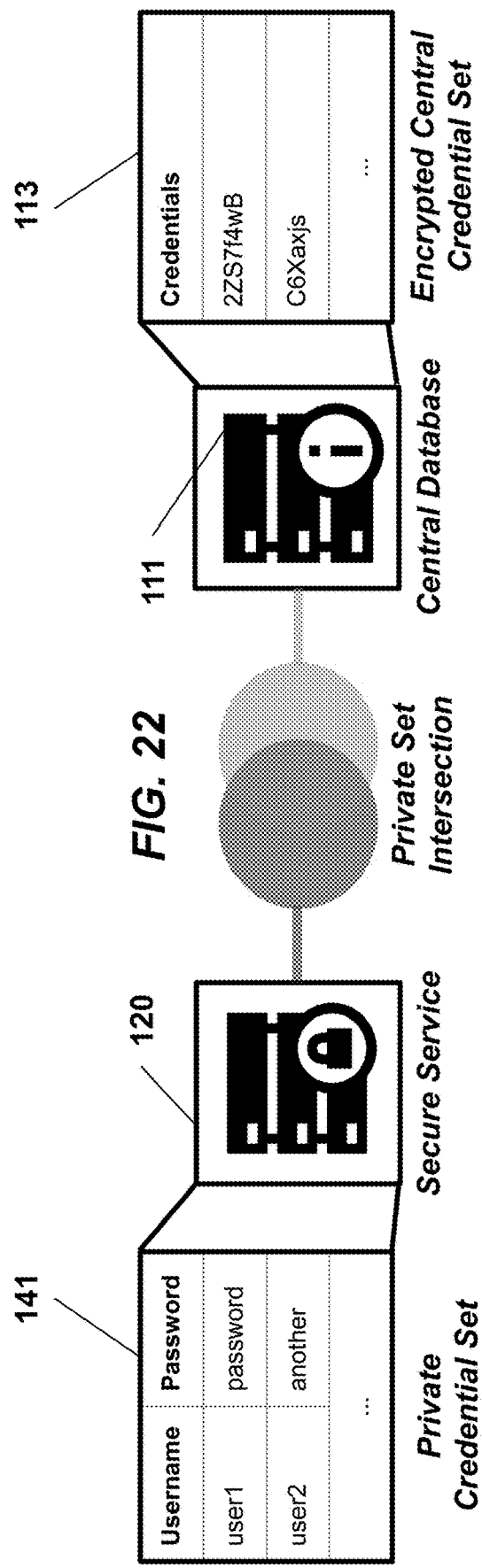
FIG. 22 shows a process of a private set intersection between a private credential set and an encrypted central credential set according to one embodiment of the present disclosure.

Referring now to FIG. 22, in one embodiment, a private set intersection is used to determine credentials that are present both in the private credential set 141 of the secure service 120 and in the encrypted central credential set 113 stored on the central database 111. Private set intersection is a secure multiparty computation cryptographic technique that in this instance allows the intersection of the credential sets to be computed without either party revealing the credentials themselves. In the symmetric variant, both the service and the central database 111 learn the intersection of the credential sets, while in the asymmetric variant, only the service learns the intersection. Because revealing plaintext or even hashed user credentials 145 to an external system often constitutes a security violation, the use of a private set intersection to enable detection of credential reuse without revealing the credentials themselves is critical for the compatibility of the system with many secure services.

The use of secure multi-party computation for cross-service credential comparison is technically advantageous over systems which compare plaintext credentials or hashes of credentials by preserving the security and privacy of the end user 131. While sharing plaintext user credentials is sufficient for preventing cross-site credential reuse, it allows services to learn the credentials of users of other services. This has the effect of compromising the privacy of the end user 131 by revealing the user's affiliation with the service. Additionally, in such a system, the compromise of a single service may result in the compromise of credentials from other services due to the sharing of credentials in plaintext. Although hashing user credentials prior to sharing them mitigates the security concerns, the privacy issues of publishing a user's affiliation with a service remains. Furthermore, users may be made vulnerable to targeted attacks by malicious services which attempt to reverse a hashed credential shared by another service using a brute-force method. Secure multi-party computation approaches including private set intersections avoid these pitfalls by providing cryptographic assurance that all services only learn the intersection of their user credentials. In a system for preventing cross-site credential reuse which utilizes a private set intersection, services will only be made aware of instances of cross-site credential reuse without learning anything about the users of other services which do not re-use credentials. Therefore, the use of multi-party computation guarantees that services do not learn user credentials they did not already have access to, thus advantageously protecting the security and privacy of the end user 131 over other approaches.

Figure 23:
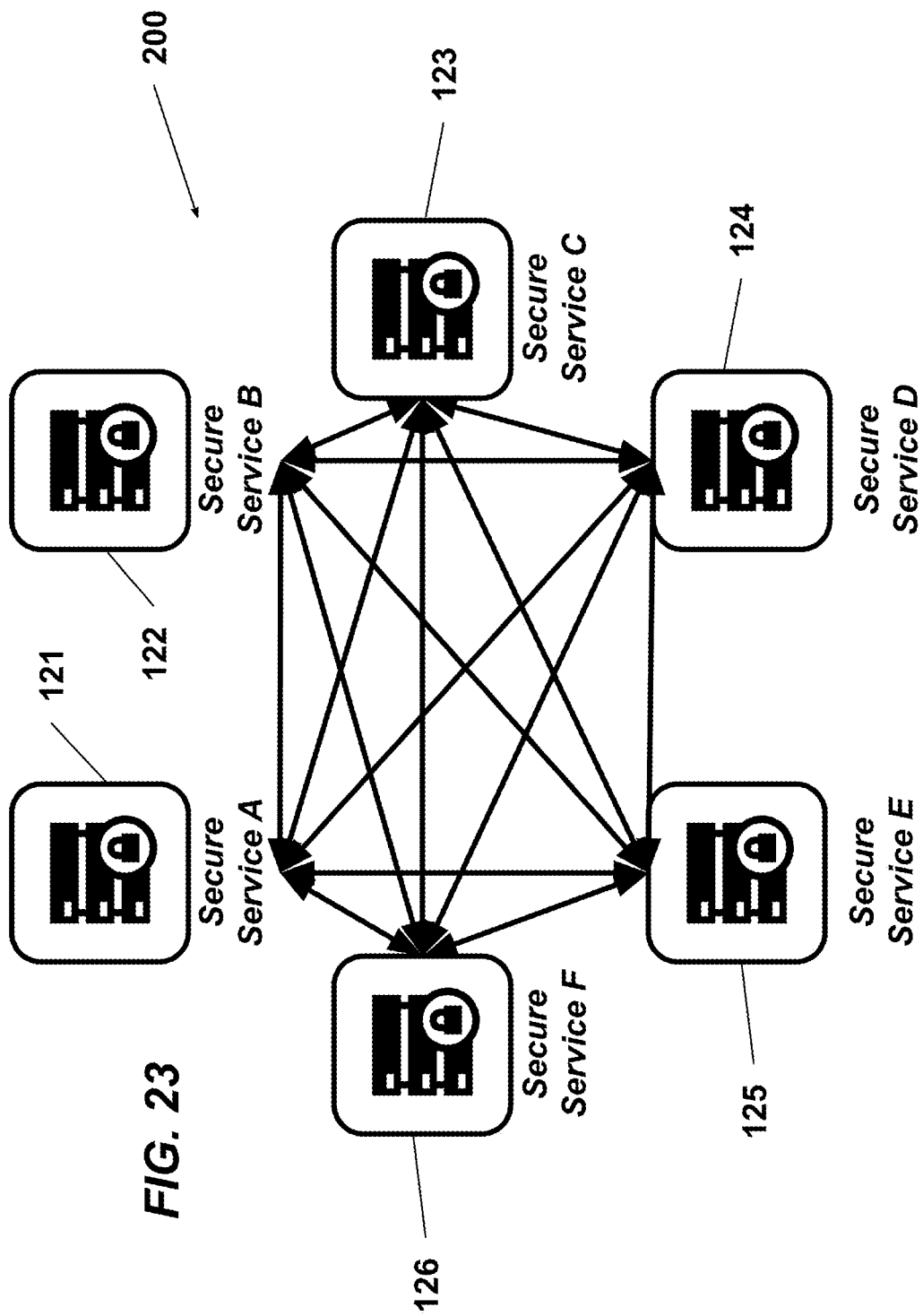
FIG. 23 shows a diagram of a decentralized system and method for preventing cross-site credential reuse according to one embodiment of the present disclosure.

FIG. 23 shows a basic embodiment of a decentralized system for preventing cross-site credential reuse 200 using two or more secure services 121-126 in communication with each other. Each of the two or more secure services 121-126 maintains its own set of user accounts and corresponding user credentials 145. When the end user 131 wishes to create a new user account on one of the two or more secure services 121-126, the service queries one or more of the other services to determine if the proposed credential for the new account matches an existing credential associated with the end user 131 on the other services. If the service determines that the proposed credential matches a known credential corresponding to an account on a separate service, the proposed credential may be rejected, thereby eliminating cross-site credential reuse. The same process may also occur when an existing user wishes to change or reset the credential on an existing account with one of the two or more secure services 121-126.

Figure 24:
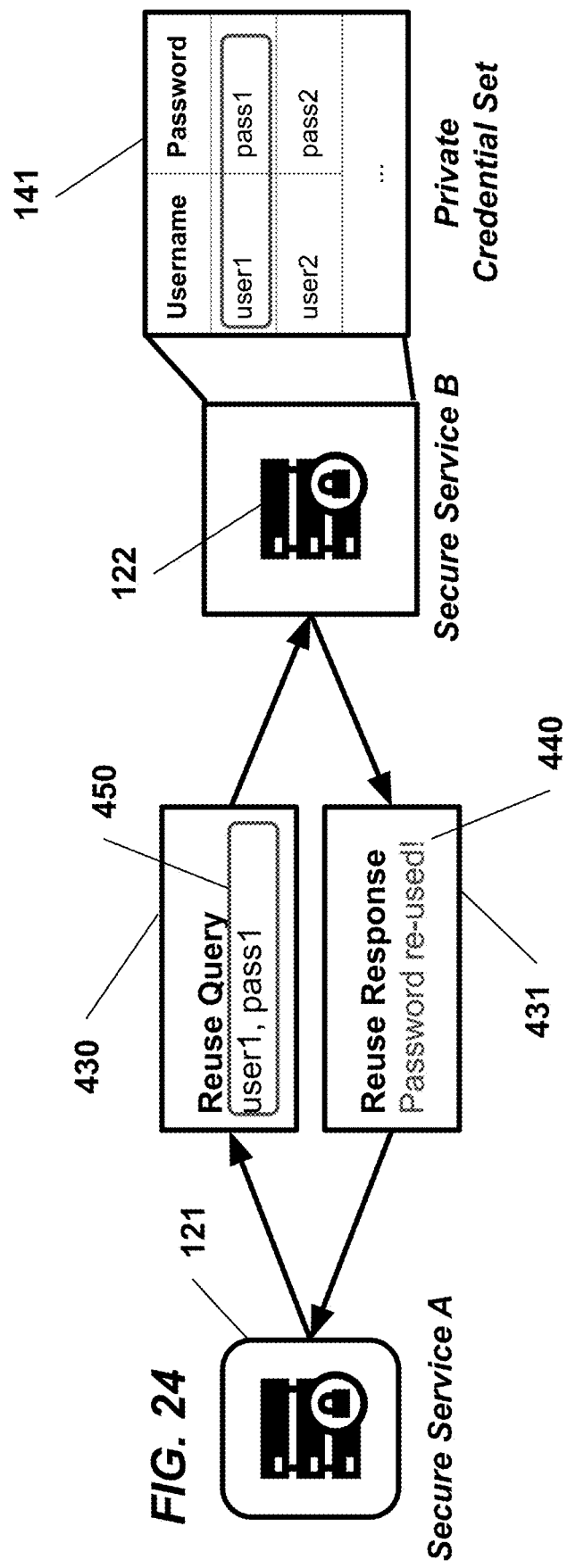
FIG. 24 shows a process of a secure service querying a separate secure service with a credential reused by the same end user according to one embodiment of the present disclosure.

Referring to FIG. 24, the first secure service 121 queries the second secure service 122 with a credential reuse query 430 containing a proposed user credential 450, and the second secure service 122 responds with the credential reuse response 431 containing status code and/or status message 440 indicating whether the same credential was used by the end user 131 on the second secure service 122. Per the example of FIG. 24, the queried username and password combination is already present in the private credential set 141 of the second secure service 122, causing it to respond with status code and/or status message 440 indicating that the credential was reused. The first secure service 121 can then reject the proposed credential. Cross-site credential reuse is thereby prevented.

Figure 25:
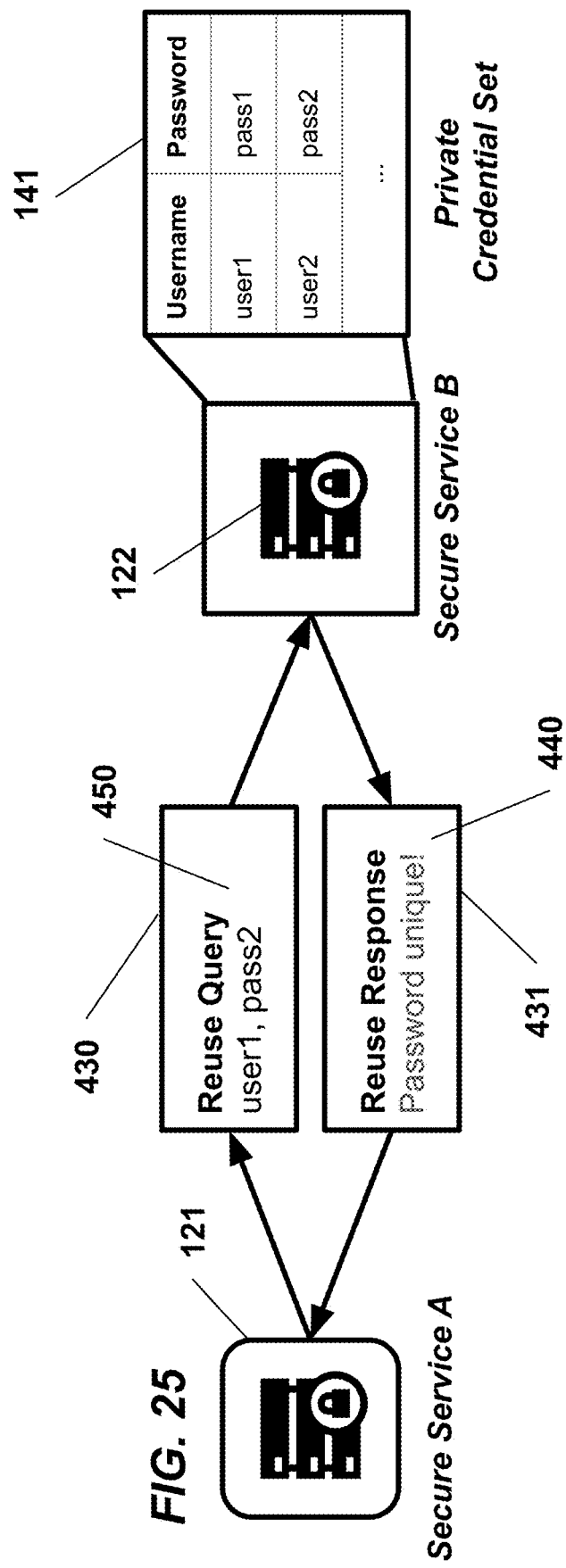
FIG. 25 shows a process of a secure service querying a separate secure service with a credential not reused by the same end user according to one embodiment of the present disclosure.

Referring now to FIG. 25, in the case that a queried username and password combination is not already known to the second secure service 122, a credential reuse response 431 is provided with status code and/or status message 440 indicating that the credential is unique.

Figure 26:
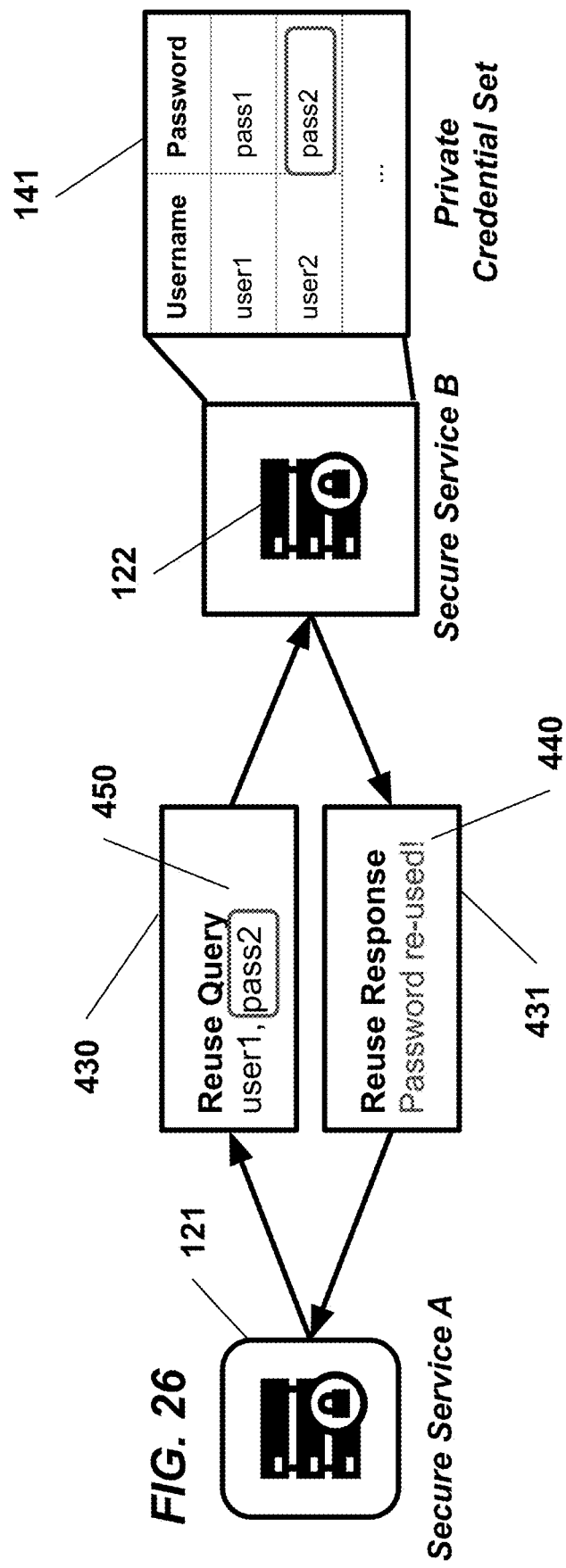
FIG. 26 shows a process of a secure service querying a separate secure service with a credential reused by a different user according to one embodiment of the present disclosure.

Referring to FIG. 26, in one embodiment, queried credentials are checked against the set of credentials associated with all users rather than just the credentials associated with the user for which they were queried. As a result, the second secure service 122 responds with credential reuse response 431 containing status code and/or status message 440 indicating whether the same credential was used by any user. This method has the additional benefit of mitigating brute-force attacks where an entire credential set consisting of credentials from numerous users are used in an attempt to access the account of a single target user. Per the example of FIG. 26, the queried credential is already known to the second secure service 122, causing the second secure service 122 to respond with status code and/or status message 440 indicating that the credential was reused. The first secure service 121 can then reject the proposed credential. Cross-site and cross-user credential reuse is thereby prevented. It is further recommended that any users matching the queried credential be notified, or their credentials automatically reset.

Figure 27:
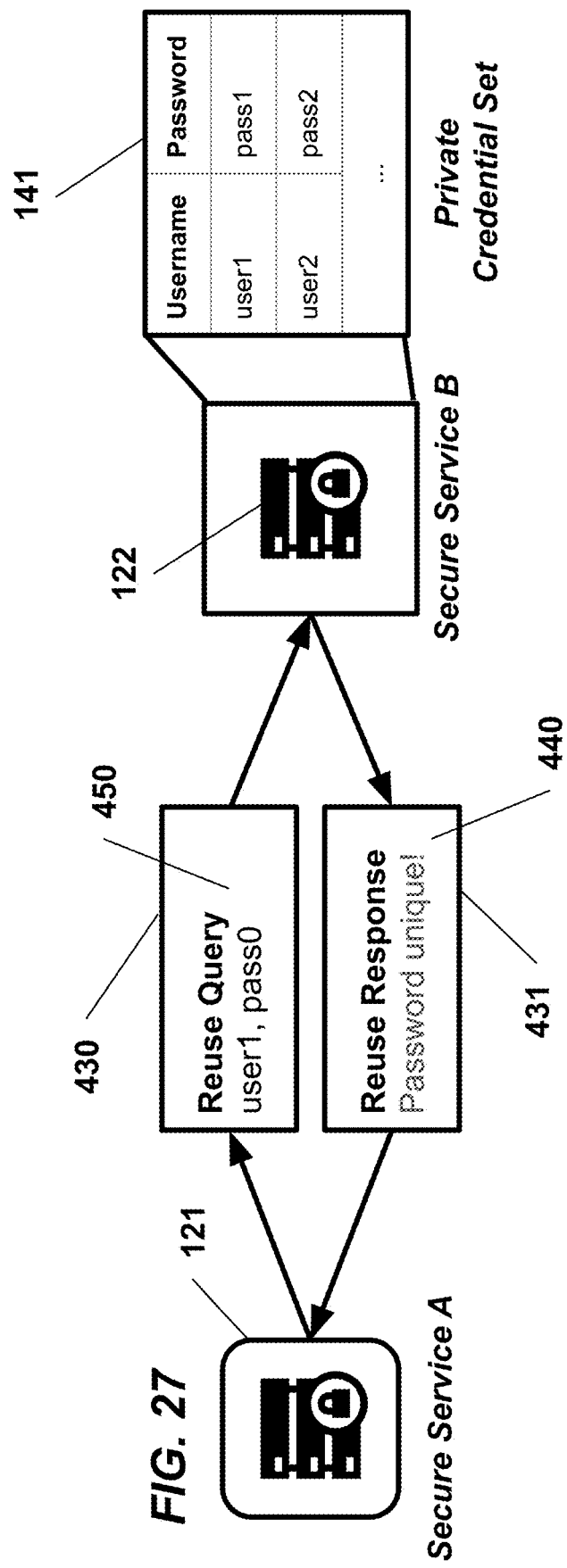
FIG. 27 shows a process of a secure service querying a separate secure service with a unique credential according to one embodiment of the present disclosure.

Referring now to FIG. 27, in the case that a queried credential is not already known to the second secure service 122, credential reuse response 431 is provided with the status code and/or status message 440 indicating that the credential is unique.

Figure 28:
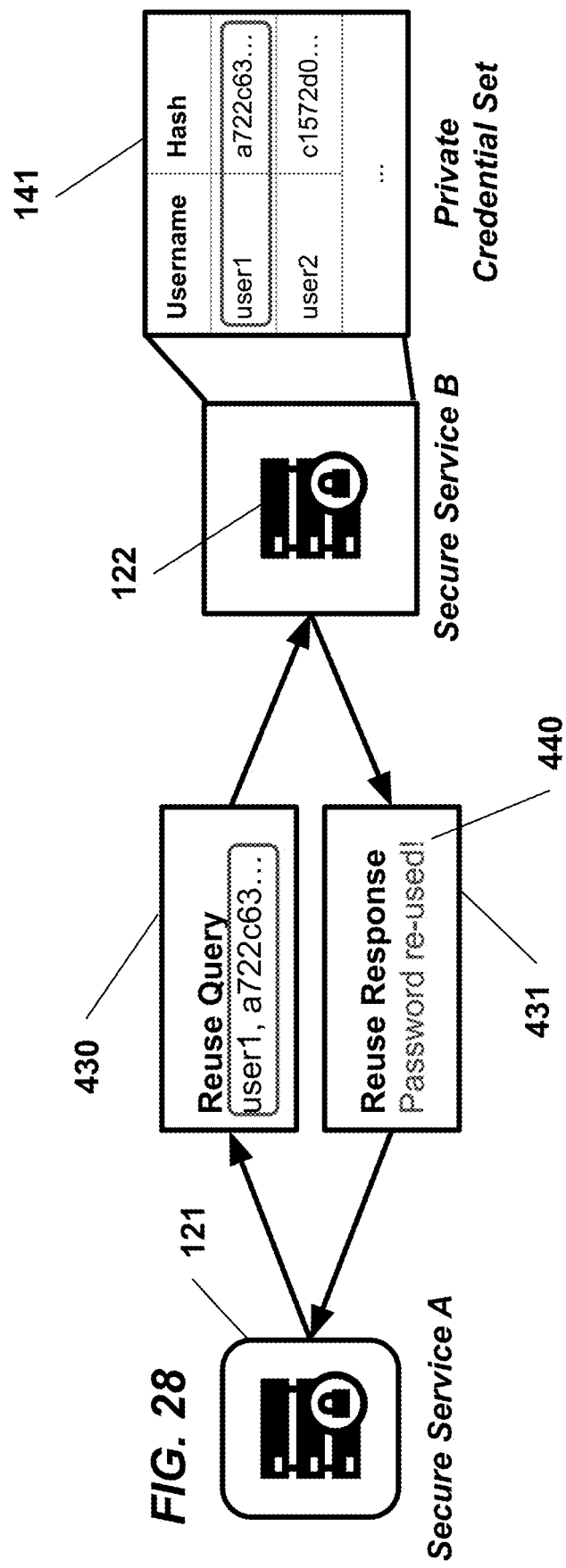
FIG. 28 shows a process of a secure service querying a separate secure service with a reused credential by providing a hash of the proposed credential according to one embodiment of the present disclosure.

Referring to FIG. 28, in one embodiment, cryptographic hashes of user credentials 145 are stored on at least one of the plurality of secure services instead of storing credentials in plaintext. When the first secure service 121 queries the second secure service 122 with credential reuse query 430 containing proposed user credential 450, a hash of the proposed credential may be provided, rather than providing the credential itself. Alternatively, the proposed credential may still be transmitted directly by the first secure service 121 and transformed into a cryptographic hash by the second secure service 122 prior to being referenced against the stored hashes. Transmission of credentials in hashed form rather than plaintext prevents the interception of communications in transit from exposing user credentials 145. Queries may alternatively be conducted by providing a combined hash of the user identifier and user credential, for example in the form SHA256(user∥pass).

Figure 29:
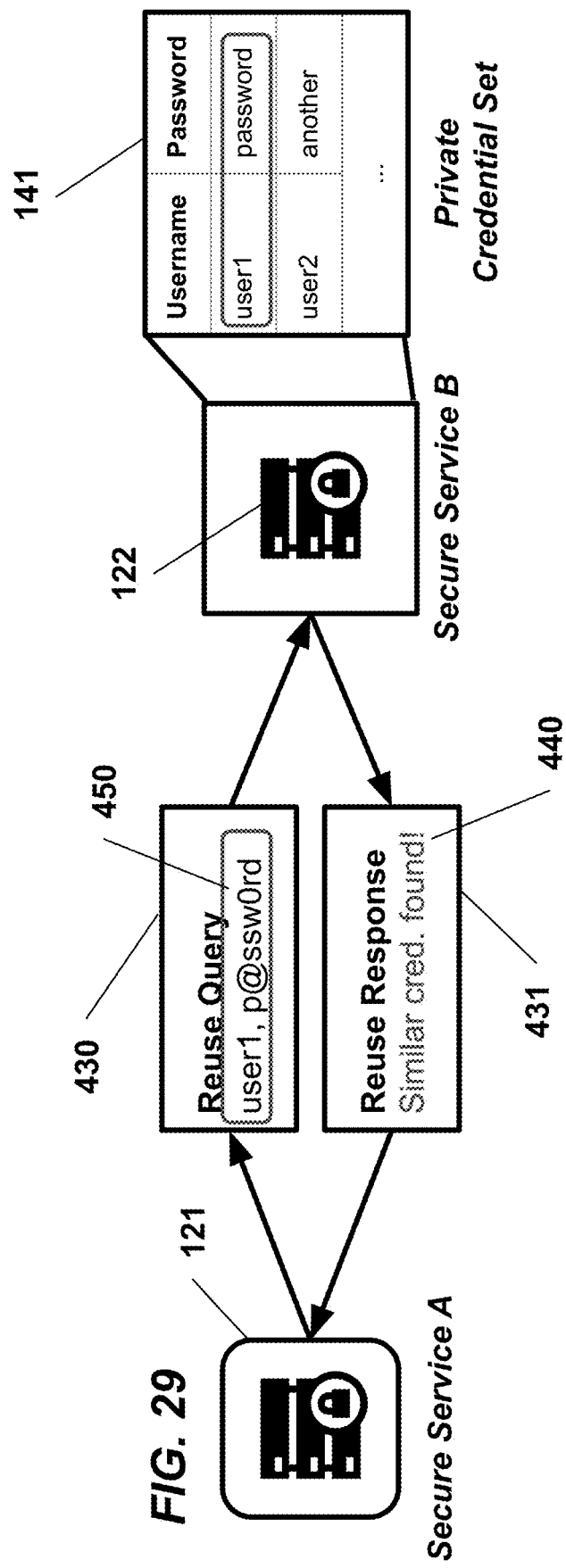
FIG. 29 shows a process of a secure service querying a separate secure service with a credential where a similar credential is identified according to one embodiment of the present disclosure.

Referring now to FIG. 29, in one embodiment, credentials that are similar but not identical to credentials known to the second secure service 122 are additionally identified. The first secure service 121 queries the second secure service 122 with credential reuse query 430 containing the proposed user credential 450, and the second secure service 122 responds with the credential reuse response 431 containing status code and/or status message 440 indicating whether a similar credential was used by the user on the second secure service 122. The second secure service 122 checks the similarity of the queried credential to other known credentials using an edit distance algorithm such as Levenshtein distance. Because attackers can use brute force tools to rapidly generate large numbers of variants of known credentials, checking credential similarity rather than only checking for identical credentials is useful for preventing advanced credential stuffing attacks.

Figure 30:
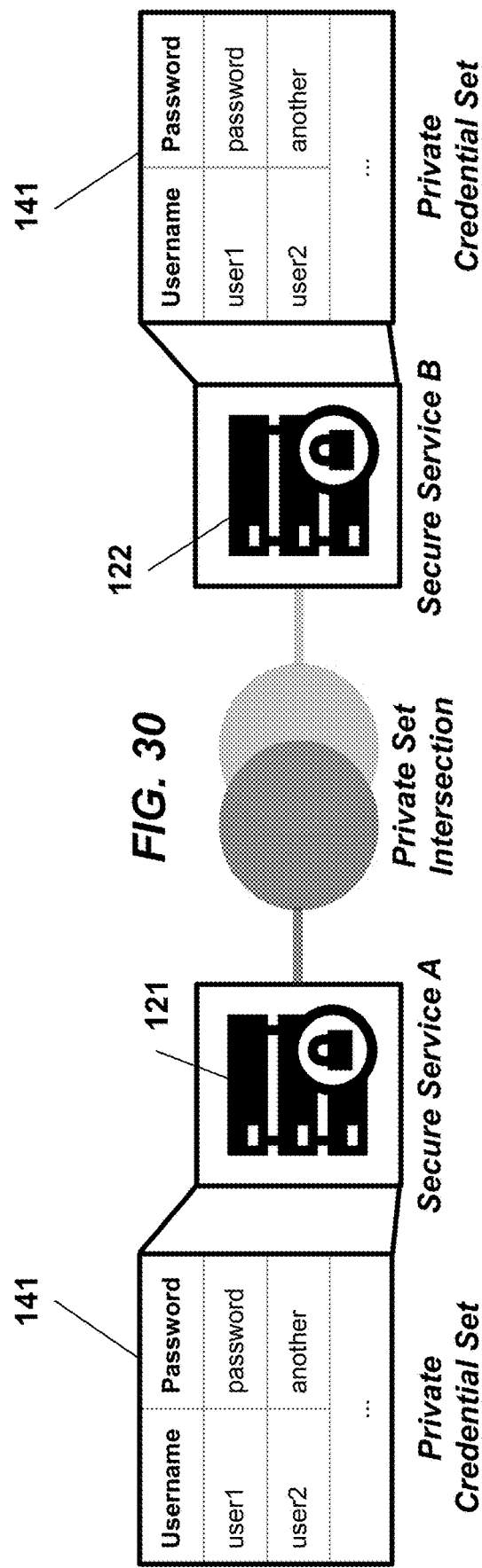
FIG. 30 shows a process of a private set intersection between a private credential set of a secure service and a private credential set of a separate secure service according to one embodiment of the present disclosure.

Referring now to FIG. 30, in one embodiment, a private set intersection is used to determine credentials that are present both in the private credential set 141 of the first secure service 121 and in the private credential set 141 stored of the second secure service 122. Because revealing plaintext or even hashed user credentials 145 to another service often constitutes a security violation, the use of a private set intersection to enable detection of credential reuse without revealing the credentials themselves is critical for the compatibility of the system with many secure services.

Figure 31:
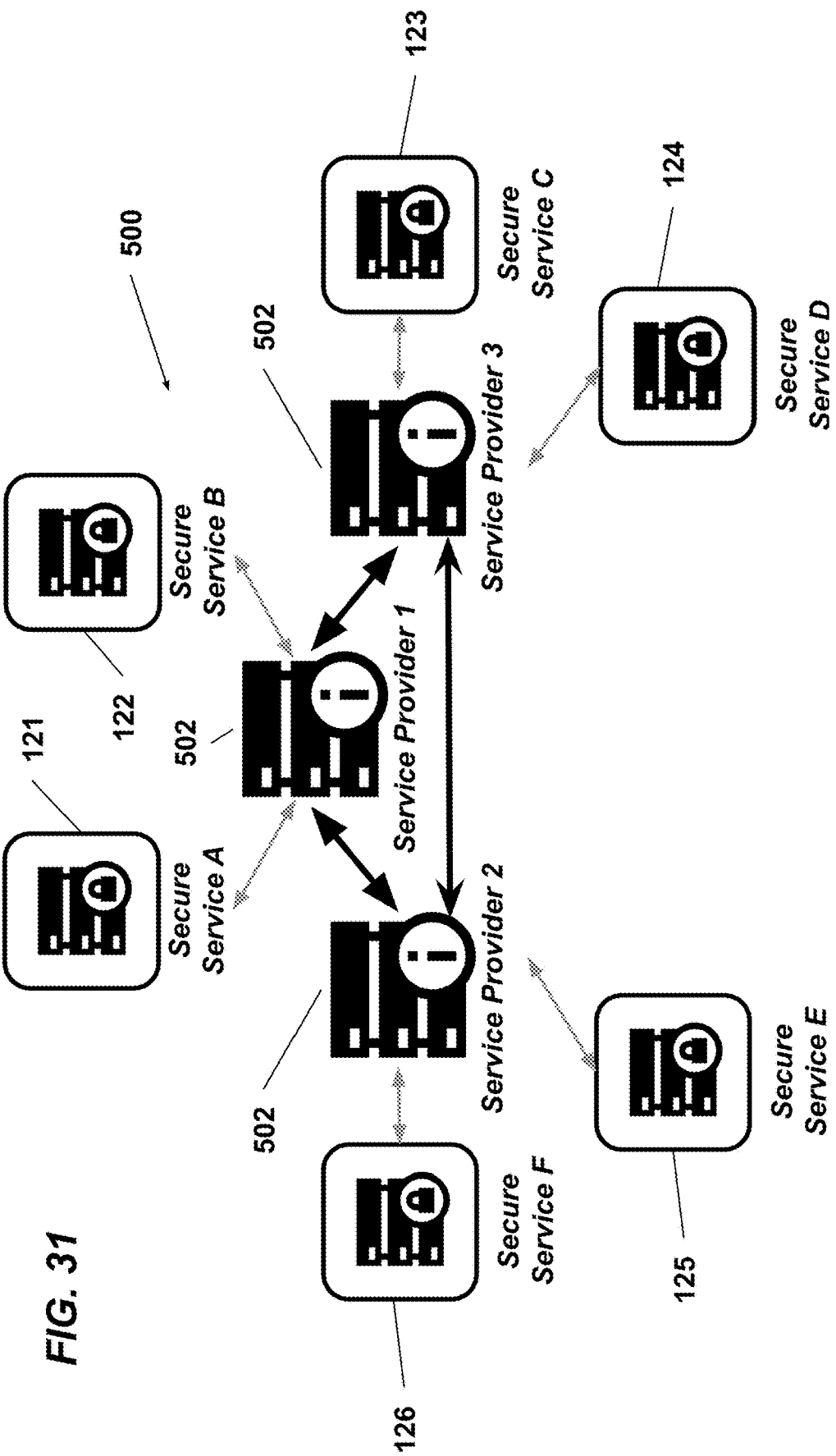
FIG. 31 shows a diagram of a federated system and method for preventing cross-site credential reuse according to one embodiment of the present disclosure.

FIG. 31 shows a basic embodiment of a federated system for preventing cross-site credential reuse 500 using two or more secure services 121-126 interacting with two or more service providers 501-503. The federated approach combines beneficial aspects of the centralized and decentralized approaches whereby secure services 121-126 each interface with the service provider 501-503 via a similar method to secure services 121-126 interfacing with the central database 111 in the previously described centralized system for preventing cross-site credential reuse 100 while the service providers 501-503 interface with other service providers 501-503 via a similar method to secure services 121-126 interfacing with other secure services 121-126 in the previously described decentralized system for preventing cross-site credential reuse 200. For example, secure services 121-126 submit registration requests 412 and credential update requests 413 to the associated service provider 501-503, which maintains the credential set 112 containing credentials of associated services. Reuse queries 430 by secure services 121-126 may be forwarded by service providers 501-503 to other service providers 501-503 in order to detect instances of credential reuse across secure services 121-126 associated with separate service providers 501-503. Therefore while each service provider 501-503 is only responsible for storing credentials relating to their associated secure services 121-126, the service providers 501-503 still benefit from being able to detect and prevent cross-site credential reuse across multiple secure services 121-126 associated with separate service providers 501-503.

The system and method for preventing cross-site credential reuse described herein advantageously reduces the feasibility of a credential stuffing attack against any services incorporating the system and method. Cross-site credential reuse is effectively eliminated by allowing services to check the uniqueness of a proposed user credential 450 either by querying a central database 111 or by querying a separate secure service 120 to check if the credential is reused, thereby allowing all credential reuse to be rejected by the service. Credential stuffing attacks are not possible in the absence of cross-site credential reuse and are therefore effectively mitigated by the proposed system and method.

The system and method for preventing cross-site credential reuse presented herein is technically advantageous over the use of rate limiting due to an increased effectiveness and lower rate of false-positives. While the rate limiting of login requests can ultimately be circumvented through techniques such as the use of botnets, proxies, and VPN servers, the proposed system and method for preventing cross-site credential reuse cannot be circumvented using these techniques as credential stuffing attacks are rendered infeasible regardless of the volume of requests. Additionally, rate limiting mechanisms have the potential to generate false-positives when users browsing a website quickly naturally generate a high volume of requests; false positives are unlikely to arise in the proposed system and method for preventing cross-site credential reuse as users will only be stopped if credential reuse is detected. The system and method for preventing cross-site credential reuse presented herein is also technically advantageous over the use of CAPTCHAs and proof-of-work mechanisms due to an increased effectiveness and improved usability. While CAPTCHAs and proof-of-work mechanisms only serve to slow the rate of credential stuffing attacks, the proposed system and method for preventing cross-site credential reuse aims to prevent credential stuffing attacks regardless of the rate of requests by eliminating cross-site credential reuse. Furthermore, CAPTCHAs and proof-of-work mechanisms hinder usability by providing barriers to legitimate users; by contrast, the proposed system and method for preventing cross-site credential reuse only interferes with normal authentication flow when cross-site credential reuse is detected, and does not increase the difficulty of logging in to a service for legitimate users. The system and method for preventing cross-site credential reuse presented herein is further technically advantageous over the use of password strength requirements due to an increased effectiveness in preventing credential stuffing. While credential strength requirements may lead users to use a single "strong" password across all of their accounts instead of practicing true cross-site credential differentiation, the system and method for preventing cross-site credential reuse presented herein ensures cross-site credential differentiation regardless of credential strength. Finally, the system and method for preventing cross-site credential reuse presented herein is technically advantageous over the use of credential blacklists due to increased effectiveness against credential stuffing attacks using newly stolen credentials. While credential blacklists prevent the reuse of credentials from data breaches which have been detected and contained, the proposed system and method for preventing cross-site credential reuse prevents the re-use of credentials across any participating services, regardless of whether a data breach has been detected. The system and method for preventing cross-site credential reuse presented herein therefore provides significant technical advantages over all methods presently in use.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A centralized system for preventing cross-site credential reuse comprising:
    a plurality of secure services hosted on a plurality of servers, each of the plurality of secure services having a set of credentials;
    a central database, hosted on at least one of the plurality of servers, for storing data relating to credentials associated with the plurality of secure services;
    whereby at least one of the plurality of secure services communicates with the central database such that the at least one of the plurality of secure services determines whether a credential is used across more than one of the plurality of secure services,
    whereby the at least one of the plurality of secure services and the central database jointly execute a secure multi-party computation cryptographic protocol such that the central database cannot ascertain the identities of users of the at least one of the plurality of secure services,
    wherein a private set intersection of credentials is computed such that the at least one of the plurality of secure services determines whether a credential is used across more than one of the plurality of secure services,
    wherein at least one of the plurality of secure services stores cryptographic hashes of credentials,
    wherein credentials that are similar but not identical are identified, and
    wherein similarity of other credentials in the central database is used to calculate credential strength.

2. The centralized system for preventing cross-site credential reuse of claim 1, wherein the central database stores both current and previous credentials.

3. The centralized system for preventing cross-site credential reuse of claim 1, wherein bulk requests are used to perform more than one operation in a single query.

4. The centralized system for preventing cross-site credential reuse of claim 1, wherein at least one of the plurality of secure services communicates with the central database to determine whether a credential is reused by a particular user across more than one of the plurality of secure services.

5. The centralized system for preventing cross-site credential reuse of claim 1, wherein at least one of the plurality of secure services communicates with the central database to determine whether a credential is reused across different users across more than one of the plurality of secure services.

6. The centralized system for preventing cross-site credential reuse of claim 1, wherein credential strength is computed as a metric of factors.

7. The centralized system for preventing cross-site credential reuse of claim 1, wherein the central database stores credentials that are known to be compromised.

8. A decentralized system for preventing cross-site credential reuse comprising:
    a plurality of secure services hosted on a plurality of servers, each of the plurality of secure services having its own set of credentials, the plurality of secure services together forming a decentralized system, wherein each of a plurality of entities in the decentralized system executes a substantively identical decentralized protocol such that no entity assumes a role of special privilege, authority, or trust in the decentralized system and no entity serves a unique or centralized function in the decentralized system;
    whereby at least one of the plurality of secure services communicates directly with at least one other of the plurality of secure services such that the at least one of the plurality of secure services determines whether a credential is used across more than one of the plurality of secure services, whereby the at least one of the plurality of secure services and the at least one other of the plurality of secure services jointly execute a secure multi-party computation cryptographic protocol such that the at least one other of the plurality of secure services cannot ascertain the identities of users of the at least one of the plurality of secure services, whereby a private set intersection of credentials is computed such that the at least one of the plurality of secure services determines whether a credential is used across more than one of the plurality of secure services, whereby at least one of the plurality of secure services stores cryptographic hashes of credentials, wherein credentials that are similar but not identical are identified, and wherein similarity of other credentials in the central database is used to calculate credential strength.

9. The decentralized system for preventing cross-site credential reuse of claim 8, wherein at least one of the plurality of secure services stores previous credentials in addition to current credentials.

10. The decentralized system for preventing cross-site credential reuse of claim 8, wherein bulk requests are used to perform more than one operation in a single query.

11. The decentralized system for preventing cross-site credential reuse of claim 8, wherein at least one of the plurality of secure services communicates with at least one other of the plurality of secure services to determine whether a credential is reused by a particular user across more than one of the plurality of secure services.

12. The decentralized system for preventing cross-site credential reuse of claim 8, wherein at least one of the plurality of secure services communicates with at least one other of the plurality of secure services to determine whether a credential is reused across different users across more than one of the plurality of secure services.

13. A federated system for preventing cross-site credential reuse comprising:
 a plurality of secure services hosted on a first plurality of servers, each of the plurality of secure services having its own set of credentials;
 a plurality of service providers hosted on a second plurality of servers at least one server, the plurality of service providers together forming a decentralized system, wherein each of a plurality of entities in the decentralized system executes a substantively identical decentralized protocol such that no entity assumes a role of special privilege, authority, or trust in the decentralized system and no entity serves a unique or centralized function in the decentralized system;

whereby at least one of the plurality of secure services communicates with at least one of the plurality of service providers such that the at least one of the plurality of secure services determines whether a credential is used across more than one of the plurality of secure services, whereby at least one of the plurality of service providers communicates directly with at least one other of the plurality of service providers such that the at least one of the plurality of service providers determines whether a credential is used across more than one of the plurality of service providers, whereby the at least one of the plurality of service providers and the at least one other of the plurality of service providers jointly execute a secure multi-party computation cryptographic protocol such that the at least one other of the plurality of service providers cannot ascertain the identities of users of the at least one of the plurality of service provider, wherein a private set intersection of credentials is computed such that the at least one of the plurality of secure services determines whether a credential is used across more than one of the plurality of secure services, wherein at least one of the plurality of secure services stores cryptographic hashes of credentials, wherein credentials that are similar but not identical are identified, and wherein similarity of other credentials in the central database is used to calculate credential strength.

14. The federated system for preventing cross-site credential reuse of claim 13, wherein at least one of the plurality of service providers stores previous credentials in addition to current credentials.

15. The federated system for preventing cross-site credential reuse of claim 13, wherein bulk requests are used to perform more than one operation in a single query.

16. The federated system for preventing cross-site credential reuse of claim 13, wherein at least one of the plurality of secure services communicates with at least one of the plurality of service providers to determine whether a credential is reused by a particular user across more than one of the plurality of secure services.

17. The federated system for preventing cross-site credential reuse of claim 13, wherein at least one of the plurality of secure services communicates with at least one of the plurality of service providers to determine whether a credential is reused across different users across more than one of the plurality of secure services.

* * * * *